(12) United States Patent
Sashino et al.

(10) Patent No.: US 7,779,392 B2
(45) Date of Patent: Aug. 17, 2010

(54) LOAD BALANCE CONTROL METHOD AND LOAD BALANCE CONTROL APPARATUS IN DATA-PROCESSING SYSTEM

(75) Inventors: Atsushi Sashino, Yokohama (JP); Tomohiko Shigeoka, Yokohama (JP); Hirokazu Fujiwara, Machida (JP); Atsuhiro Yokoro, Yokohama (JP); Akio Igarashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1068 days.

(21) Appl. No.: 10/998,726

(22) Filed: Nov. 30, 2004

(65) Prior Publication Data

US 2005/0144607 A1      Jun. 30, 2005

(30) Foreign Application Priority Data

Dec. 1, 2003      (JP)      ............... 2003-401699

(51) Int. Cl.
*G06F 9/44* (2006.01)
*G06F 9/46* (2006.01)

(52) U.S. Cl. .............. 717/127; 717/131; 717/162; 717/166; 718/105

(58) Field of Classification Search ............ 717/124, 717/120–135, 162, 166; 718/105
See application file for complete search history.

(56) References Cited

U.S. PATENT DOCUMENTS

| | | | | |
|---|---|---|---|---|
| 6,128,644 | A * | 10/2000 | Nozaki | 709/203 |
| 6,249,801 | B1 * | 6/2001 | Zisapel et al. | 718/105 |
| 6,385,652 | B1 * | 5/2002 | Brown et al. | 709/227 |
| 6,393,458 | B1 * | 5/2002 | Gigliotti et al. | 709/203 |
| 6,397,252 | B1 * | 5/2002 | Sadiq | 709/226 |
| 6,484,204 | B1 * | 11/2002 | Rabinovich | 709/226 |
| 6,986,139 | B1 * | 1/2006 | Kubo | 718/105 |
| 7,197,490 | B1 * | 3/2007 | English | 707/1 |
| 7,237,239 | B1 * | 6/2007 | Goel et al. | 717/170 |
| 2004/0177144 | A1 * | 9/2004 | Yip | 709/225 |
| 2005/0010558 | A1 * | 1/2005 | Dettinger et al. | 707/3 |

FOREIGN PATENT DOCUMENTS

WO      0028464      5/2000

OTHER PUBLICATIONS

Dynamic load balancing of iterative data parallel problems on a workstation cluster, Hye-Seon Maeng; Hyoun-Su Lee; Tack-Don Han; Sung-Bong Yang; Shin-Dug Kim, 1997, IEEE, pp. 563-567.*

(Continued)

*Primary Examiner*—Wei Y Zhen
*Assistant Examiner*—Satish Rampuria
(74) *Attorney, Agent, or Firm*—Brundidge & Stanger, P.C.

(57) ABSTRACT

Object information is read that denotes a load state of the object from storage and selects an object having a load that is lower than a predetermined value. Then, a reference to an object allocation control part is returned that allocates the selected object to a destination as a response through communicating means. In allocating an object, the object information is read from the storage to select an object having a load that is lower than a predetermined value. Then, a reference to a dispatcher is returned that executes the selected object to the destination as a response through the communicating means. In executing the object, the object information is read from the storage and executes the object if the object has a load that is lower than a predetermined threshold value.

2 Claims, 20 Drawing Sheets

OTHER PUBLICATIONS

An effective selection policy for load balancing in software DSM, Tyng-Yeu Liang; Ce-Kuen Shieh; Jun-Qi Li, 2000, IEEE, pp. 105-112.*

A group-based load balance scheme for software distributed shared memory systems, Zhuang, Y.C.; Ce-Kuen Shieh; Tyng-Yue; Liang; Jun-Qi Lee; Li-Ming Tseng, 2001, IEEE, pp. 371-378.*

* cited by examiner

FIG.5

SIMULTANEOUS EXECUTION CONTROLLER ~217

EXECUTION CONTROL INFORMATION TABLE ~500

| OBJECT | NUMBER OF CURRENT ACTIVE | MAX. NUMBER OF EXECUTED OBJECTS | NUMBER OF WAITING |
|---|---|---|---|
| A | 2 | 5 | 0 |
| B | 4 | 5 | 0 |
| C | 5 | 5 | 2 |
| ... | ... | ... | ... |
| ... | ... | ... | ... |

FIG.19

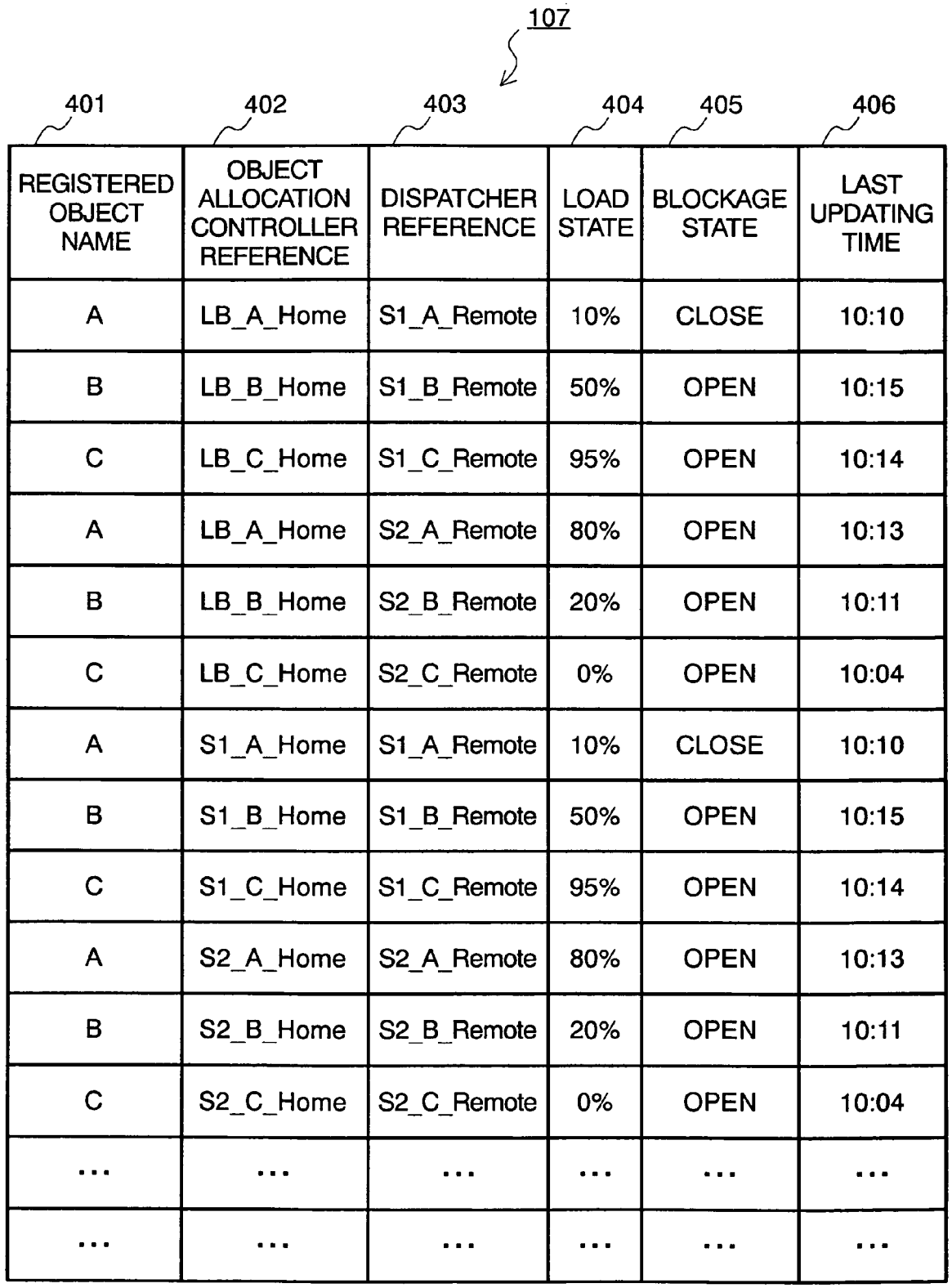

| REGISTERED OBJECT NAME | OBJECT ALLOCATION CONTROLLER REFERENCE | DISPATCHER REFERENCE | LOAD STATE | BLOCKAGE STATE | LAST UPDATING TIME |
|---|---|---|---|---|---|
| A | LB_A_Home | S1_A_Remote | 10% | CLOSE | 10:10 |
| B | LB_B_Home | S1_B_Remote | 50% | OPEN | 10:15 |
| C | LB_C_Home | S1_C_Remote | 95% | OPEN | 10:14 |
| A | LB_A_Home | S2_A_Remote | 80% | OPEN | 10:13 |
| B | LB_B_Home | S2_B_Remote | 20% | OPEN | 10:11 |
| C | LB_C_Home | S2_C_Remote | 0% | OPEN | 10:04 |
| A | S1_A_Home | S1_A_Remote | 10% | CLOSE | 10:10 |
| B | S1_B_Home | S1_B_Remote | 50% | OPEN | 10:15 |
| C | S1_C_Home | S1_C_Remote | 95% | OPEN | 10:14 |
| A | S2_A_Home | S2_A_Remote | 80% | OPEN | 10:13 |
| B | S2_B_Home | S2_B_Remote | 20% | OPEN | 10:11 |
| C | S2_C_Home | S2_C_Remote | 0% | OPEN | 10:04 |
| ... | ... | ... | ... | ... | ... |
| ... | ... | ... | ... | ... | ... |

LOAD BALANCE CONTROL METHOD AND LOAD BALANCE CONTROL APPARATUS IN DATA-PROCESSING SYSTEM

BACKGROUND OF THE INVENTION

The present invention relates to a program control method for controlling program execution in distributed object processings.

In a conventional distributed object system, if a client side processing apparatus is to receive a predetermined service (a function realized by executing a program or object) from a server side processing apparatus, the client side processing apparatus inquires the server side processing apparatus that supplies a naming service about whether or not it can solve the object name and receives a reference to the object (information used to identify the object uniquely in a distributed object environment) therefrom. The client side processing apparatus then requests a specific server side processing apparatus denoted by the received reference for supply of the above service and receives the processing result from the server side processing apparatus. The server side processing apparatus obtains the processing result with use of the object method it has called up.

Recently, the conventional distributed object system has also come to obtain a reference to such an object via a factory (object allocation processing part). In other words, the client side processing apparatus obtains a reference to the factory from the server side processing apparatus that supplies the naming service, and requests the server side processing apparatus denoted by the factory reference for object allocation to obtain the reference to the object and requests the server side processing apparatus denoted by the object reference for method calling to receive the processing result.

Such a naming service in a distributed object environment as described above, as well as a technique for improving the error resistance of a distributed processing system and enabling the efficient scalability therein are disclosed in, for example, JP-A No.529862/2002.

In the above conventional distributed object system, references are supplied without taking none of the load state of the server side processing apparatus and load state changes with time into consideration. Therefore, if a load state change occurs between reference obtaining and processing requesting processes, the load is often maldistributed at the server side processing apparatus. This has been a problem.

In other words, if a load state change occurs between when a client side processing apparatus obtains a reference to a factory from a server side processing apparatus that supplies a naming service and when the client side processing apparatus requests the server side processing apparatus denoted by the factory reference for object allocation, the processing load is maldistributed in the server side processing apparatus that processes the factory. If a load state change occurs between when the client side processing apparatus obtains a reference to an object after the object is allocated and when the client side processing apparatus requests the server side processing apparatus denoted by the object reference for method calling, the processing load comes to be maldistributed in the server side processing apparatus that calls the method. Because of the maldistributed processing load in the server side processing apparatus that processes the factory and calls the method as described above, the performance of the whole distributed object system comes to be degraded. This has been another problem.

SUMMARY OF THE INVENTION

Under such circumstances, it is an object of the present invention to solve the above conventional problems and provide a technique capable of executing each distributed object processing efficiently in accordance with such a processing load state.

Specifically, according to the present invention, one-dimensionally managed object information is used to return both of a reference to an object allocation controller and a reference of a dispatcher, as well as to execute each object in the program controlling apparatus that controls program execution in each distributed object processing.

In receiving a predetermined service through a distributed object processing, the client side information processing apparatus inquires the program controller of whether it is possible to solve the name of the target object that supplies the service through a communication device.

In one aspect, the present invention is directed to the program controller (alternatively to computer, information processing apparatus, or program/object for executing similar processings.) The program controller, when the communication device receives the object name solving inquiry from the client side information processing apparatus, accesses the object information management table provided in a storage device to access the object information management table to read the object information that denotes the load state of the inquired object, and selects an object having the minimum load or having a load that is lower than a predetermined threshold value among the objects set in the table. After that, the program controller reads the reference to the object allocation controller that allocates the selected object from the object information management table, and sends the read reference to the client side information processing apparatus as a response through a communication device.

It should be noted that the reference is information used to identify an object allocation controller for allocating an object uniquely in a distributed object environment and the reference includes a network protocol and/or address information used to reach a program controller provided with the object allocation controller, as well as information used to identify the object allocation controller in the program controller.)

The client side processing apparatus then sends the object allocation request to the program controller identified by the object allocation controller reference obtained as the response, through the communication device.

In another aspect, the program controller of the present invention, when receiving the object allocation request from the client side information processing apparatus through the communication device, accesses the object information management table provided in the storage device to read the object information that denotes the requested object load state therefrom, and selects an object having the minimum load or having a load that is lower than a predetermined threshold value from among the objects set in the table. After that, the program controller reads the reference to the dispatcher that executes the selected object from the object information management table. (The reference is information used to identify a dispatcher for executing the object in a distributed object environment and the reference includes a network protocol and/or address information used to reach a program controller provided with the dispatcher, as well as information used to identify the dispatcher in the program controller.) The program controller then sends the read reference to the client side information processing apparatus as a response through the communication device.

The client side processing apparatus then sends the object execution request to a different program controller identified by the dispatcher reference obtained from the response through the communication device.

In still another aspect, the program controller of the present invention, when receiving an object execution request from a client side information processing apparatus through a communication device, accesses the object information management table provided in a storage device to read the object information that denotes the load state of the requested object therefrom, and selects an object having a load that is lower than a predetermined threshold value from among the objects set in the table. Then, the program controller sends the object processing result to the client side information processing apparatus as a response.

According to the present invention, the program controller, when executing a distributed object processing, returns the object allocation controller reference and the dispatcher reference, as well as executes the object according to the one-dimensionally managed object information, thereby it is possible to execute each distributed object processing efficiently according to the load state.

Other and further objects, features and advantages of the invention will appear more fully from the following description.

BRIEF DESCRIPTION OF THE DRAWINGS

FIG. 5 is an internal block diagram of a simultaneous execution controller 217 in the embodiment of the present invention;

FIG. 19 is an example of an object information management table 107 provided when the load distribution server LB1700 in the embodiment of the present invention is used.

DESCRIPTION OF THE EMBODIMENTS

Hereunder, a description will be made for a program controller for executing a program in a distributed object processing in an embodiment of the present invention. The clients and servers shown in FIGS. 1 through 3, as well as FIGS. 17 and 18 and processings performed in each client/server are assumed to be realized with a program or object and/or hardware component.

Figure 1:
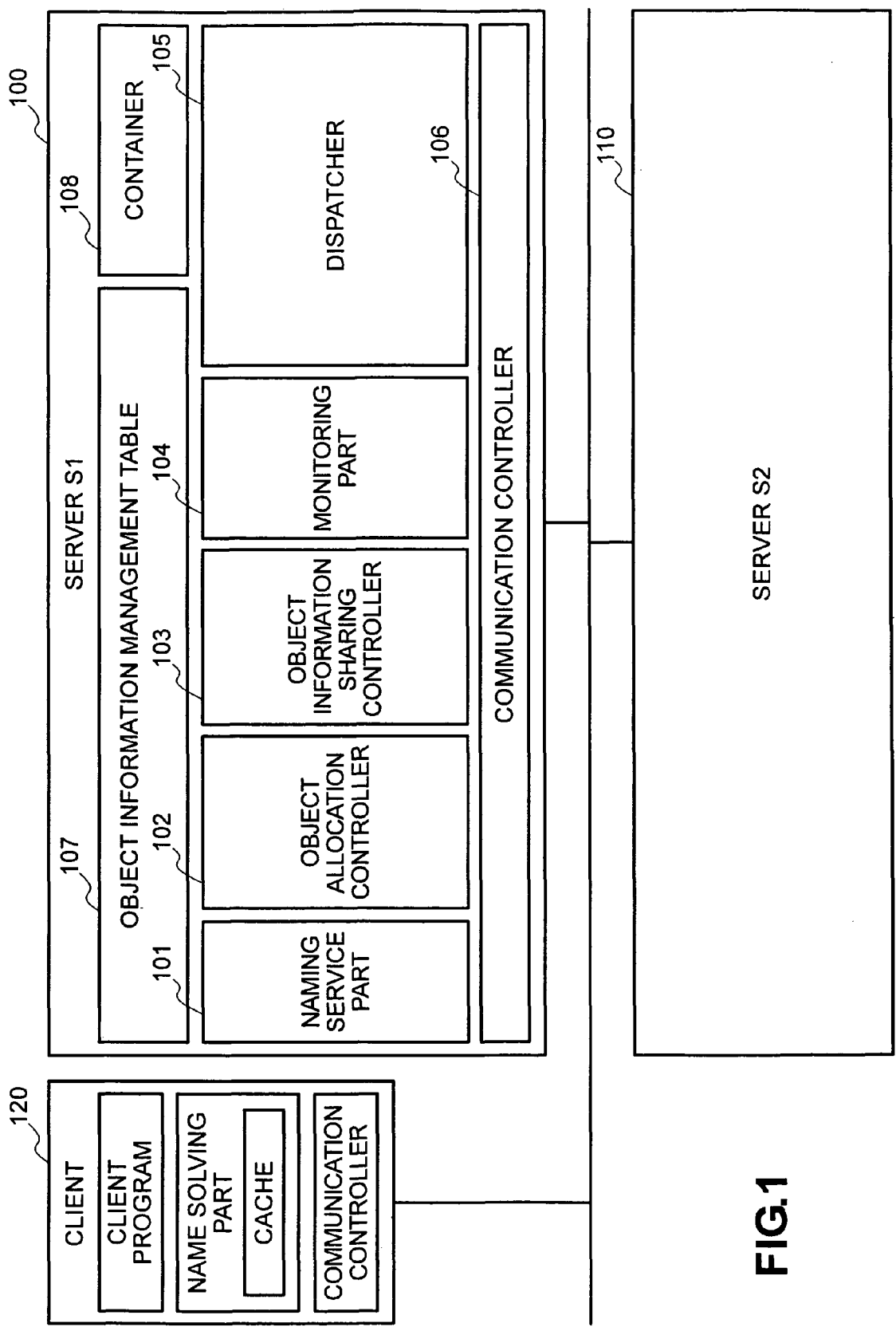
FIG. 1 is a schematic block diagram of a program controller in an embodiment of the present invention.

FIG. 1 shows a schematic block diagram of a program controller in this embodiment. As shown in FIG. 1, the program controller includes server side processing apparatuses 100 and 110, as well as a client side processing apparatus 120.

Each of the server side processing apparatuses 100 and 110 is a program controller that controls a program in each distributed object processing by processing inquiries and processing requests received from the client side processing apparatus 120 and returns an object allocation controller/dispatcher reference thereto as a response, as well as executes the object in accordance with the one-dimensionally managed object information.

The client side processing apparatus 120 is a client side information processing apparatus that issues inquiries and processing requests to the server side processing apparatuses 100 and 110 and receives the object allocation controller/dispatcher reference, as well as the execution result of the object.

The server side processing apparatus 100 includes a naming service part 101, an object allocation controller 102, an object information sharing controller 103, a monitoring part 104, a dispatcher 105, and a communication controller 106.

The naming service part 101 reads object information that denotes the load state of an object from an object information management table 107 provided in a storage device when solving an object name, and selects an object having the minimum load or having a load that is lower than a predetermined threshold value, and sends the reference to the object allocation controller 102 that allocates the selected object as a response through a communication device.

The object allocation controller 102 is a processing part that reads object information from the object information management table 107 provided in the storage device when allocating an object, selects an object having the minimum load or having a load that is lower than a predetermined threshold value, and sends the reference to the dispatcher 105 that executes the selected object as a response through the communication device.

The object information sharing controller 103 is a processing part that reads the above object information from the object information management table 107 provided in the storage device, and sends the read object information to a different server side processing apparatus such as a server side processing apparatus 110 through the communication device.

The monitoring part 104 is a processing part that monitors the operation state of the different server side processing apparatus. The dispatcher 105 is a processing part that, when executing an object, reads the object information from the object information management table 107 provided in the storage device and executes the object if the load is under a predetermined threshold value, and returns the processing result to the destination through the communication device. The communication controller 106 is a processing part that controls communications with the different server side processing apparatus and the client side processing apparatus 120.

A program used to enable the server side processing apparatus 100 to function as any of the naming service part 101, the object allocation controller 102, the object information sharing controller 103, the monitoring part 104, the dispatcher 105, and the communication controller 106 is assumed to be recorded in such a recording medium as CD-ROM or the like, and stored in a magnetic disk or the like to be loaded into a memory to be executed. The program may also be recorded in another recording medium other than the CD-ROM. The program may also be installed in an information processing apparatus from the recording medium or the program may be used by accessing the recording medium through a network.

The server side processing apparatus 100 includes an object information management table 107 and a container 108.

The object information management table 107 is a table for storing object information for denoting the load state of each object. The container 108 is a storage area for storing objects.

Figure 2:
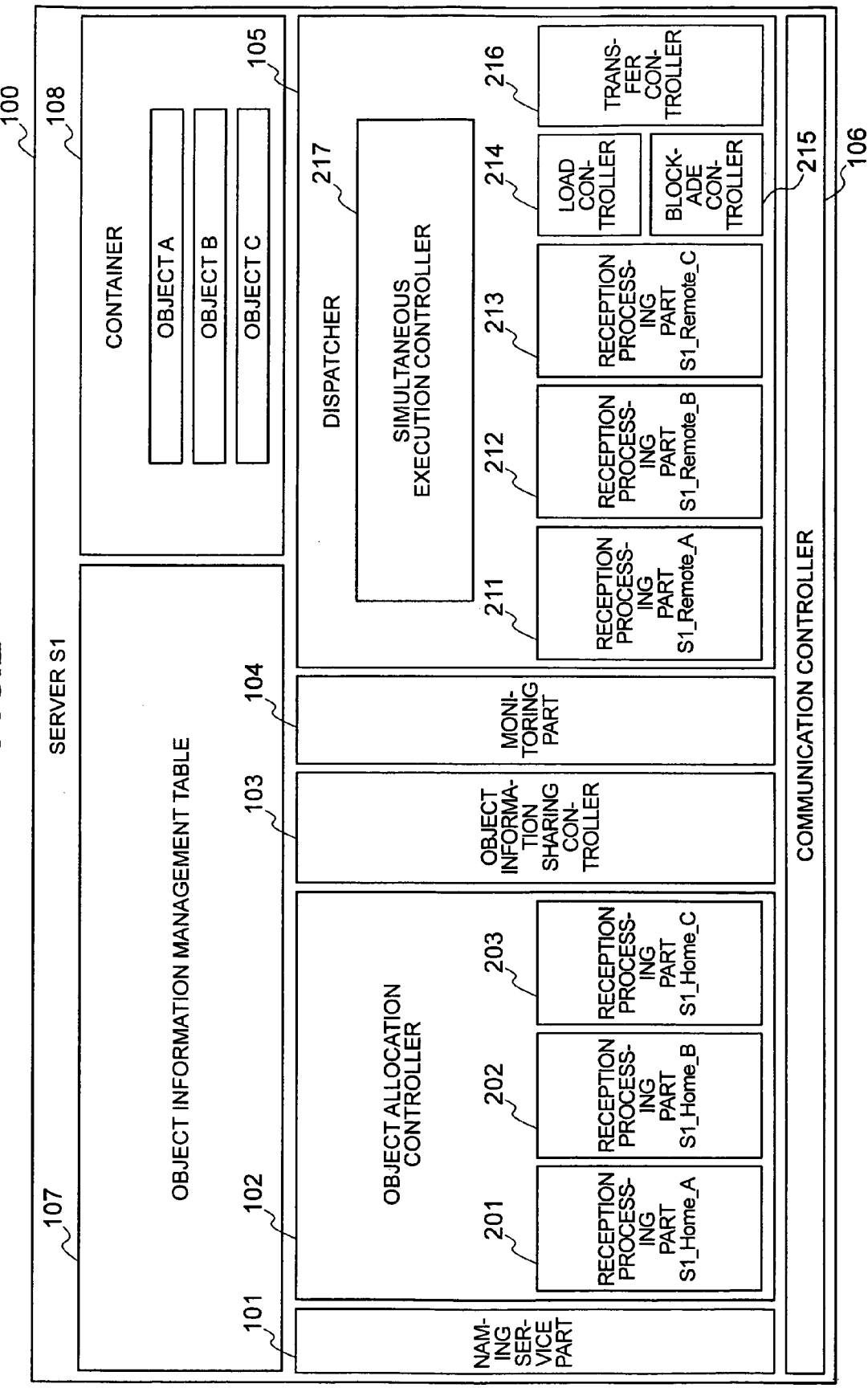
FIG. 2 is an internal block diagram of a server side processing apparatus 100 in the embodiment of the present invention.

FIG. 2 shows an internal block diagram of the server side processing apparatus 100 in this embodiment. As shown in FIG. 2, the server side processing apparatus 100 includes reception processing parts 201 to 203, reception processing parts 211 to 213, a load controller 214, a blockage controller 215, a transfer controller 216, and a simultaneous execution controller 217.

Each of the reception processing parts 201 to 203 is a processing part for accepting object allocation requests. Each of the reception processings 211 to 213 is a processing part for accepting object execution requests. The load controller 214 is a processing part for checking the load state of each requested object and managing load state changes caused by executed objects.

The blockage controller 215 is a processing part for checking the blockage state of each requested object and controlling the blockage state of the object. The transfer controller 216 is a processing part that, if the load of each requested object is over a predetermined threshold value and the object is closed, reads the reference to a different dispatcher that executes the object from the storage device, and transfers the execution request to the dispatcher through the communication device. The simultaneous execution controller 217 is a processing part for controlling the simultaneous execution of a plurality of objects.

The program used to enable the server side processing apparatus 100 to function as any of the reception processing parts 201 to 203, 211 to 213, the load controller 214, the blockage controller 215, the transfer controller 216, and the simultaneous execution controller 217 is assumed to be recorded in such a recording medium as CD-ROM or the like, and stored in a magnetic disk or the like to be loaded into a memory to be executed. The program may also be recorded in another recording medium other than CD-ROM. The program may also be installed in an information processing apparatus from the recording medium or the program may be used by accessing the recording medium through a network.

Figure 3:
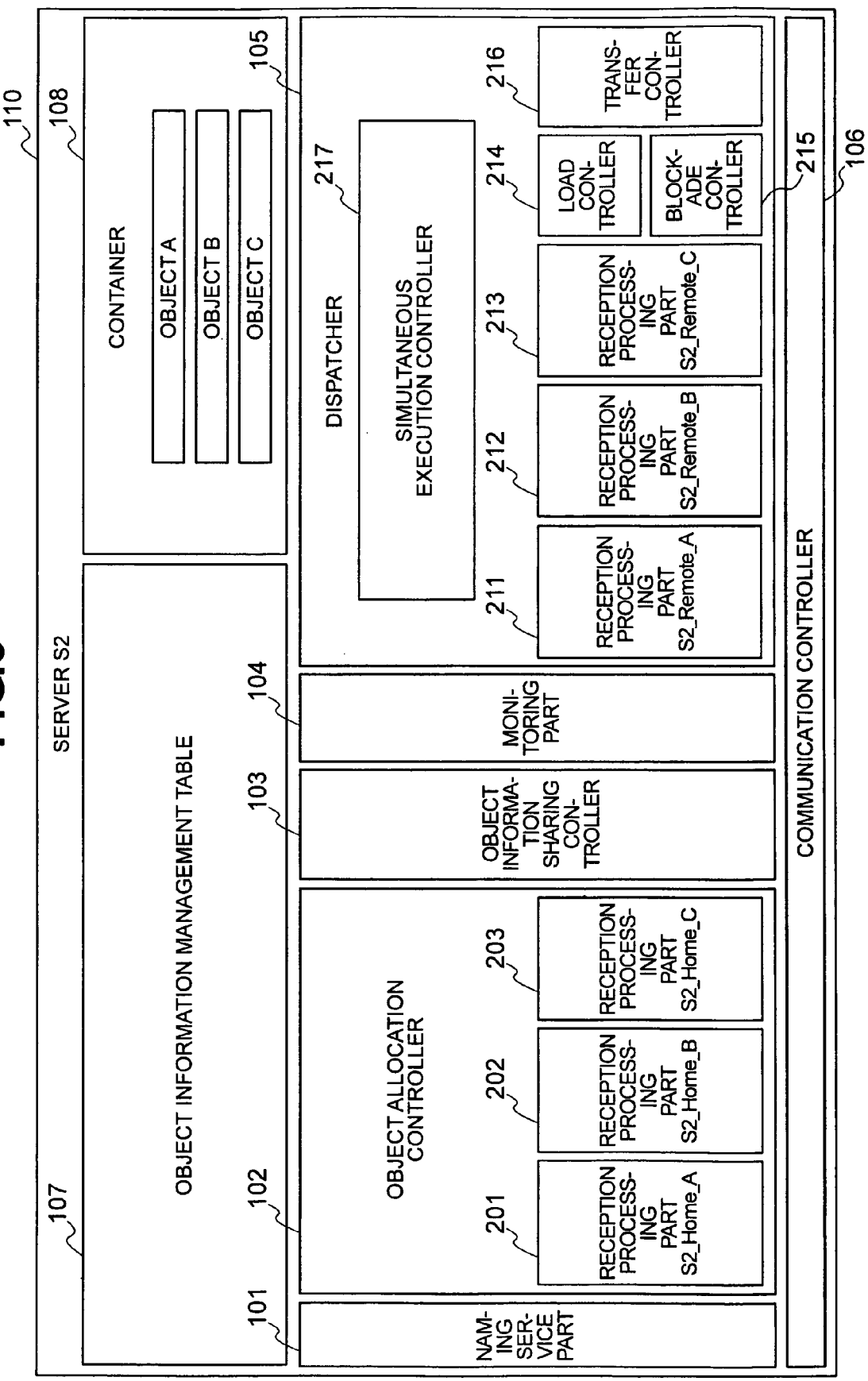
FIG. 3 is an internal block diagram of a server side processing apparatus 110 in the embodiment of the present invention.

FIG. 3 shows an internal block diagram of the server side processing apparatus 110. As shows in FIG. 3, the internal configuration of the server side processing apparatus 110 is the same as that of the server side processing apparatus 100.

Figure 4:
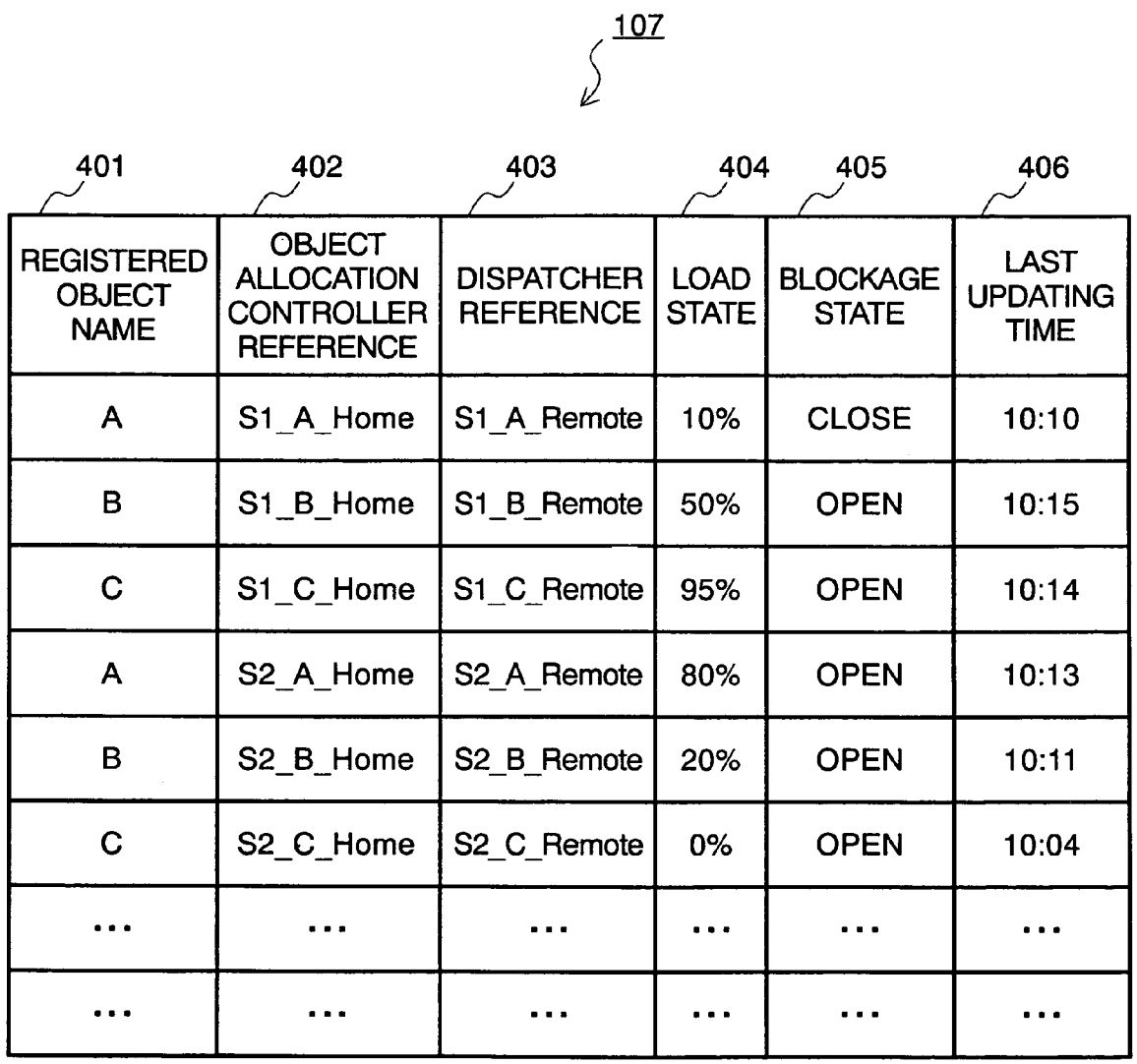
FIG. 4 is an example of an object information management table in the embodiment of the present invention.

FIG. 4 shows an example of the object information management table 107 in this embodiment. As shown in FIG. 4, the object information management table 107 includes fields of registered object name 401 for denoting each registered object name, object allocation controller reference 402 for denoting the reference to the object allocation controller 102, dispatcher reference 403 for denoting the reference to the dispatcher 105, load state 404 for denoting the utilization rate of each of the CPU and the memory at the last updating time 406 of each object as load information corresponding to each object, blockage state 405 for denoting whether or not the object is executable, and last updating time 406 for denoting the last updated time of the object.

At that time, the object allocation controller reference 402 is assumed to be information used to identify the object allocation controller 102 uniquely in a distributed object environment and the information includes a network protocol and address information used to reach the server side processing apparatus 100 or 110 provided with the object allocation controller 102, as well as information used to identify any of the reception processing parts 201 to 203 of the object allocation controller 102 provided in the server side processing apparatus 100 or 110. The dispatcher reference 403 is information used to identify the dispatcher 105 uniquely in a distributed object environment and the information is assumed to include a network protocol and address information used to reach the server side processing apparatus 100 or 110 provided with the dispatcher 105, as well as information used to identify any of the reception processing parts 211 to 213 of the dispatcher 105 provided in the server side processing apparatus 100 or 110.

FIG. 5 shows an internal block diagram of the simultaneous execution controller 217 in this embodiment. As shown in FIG. 5, the execution control information table 500 of the simultaneous execution controller 217 contains the number of current active objects, the maximum number of executed objects, and the number of waiting objects.

Figure 6:
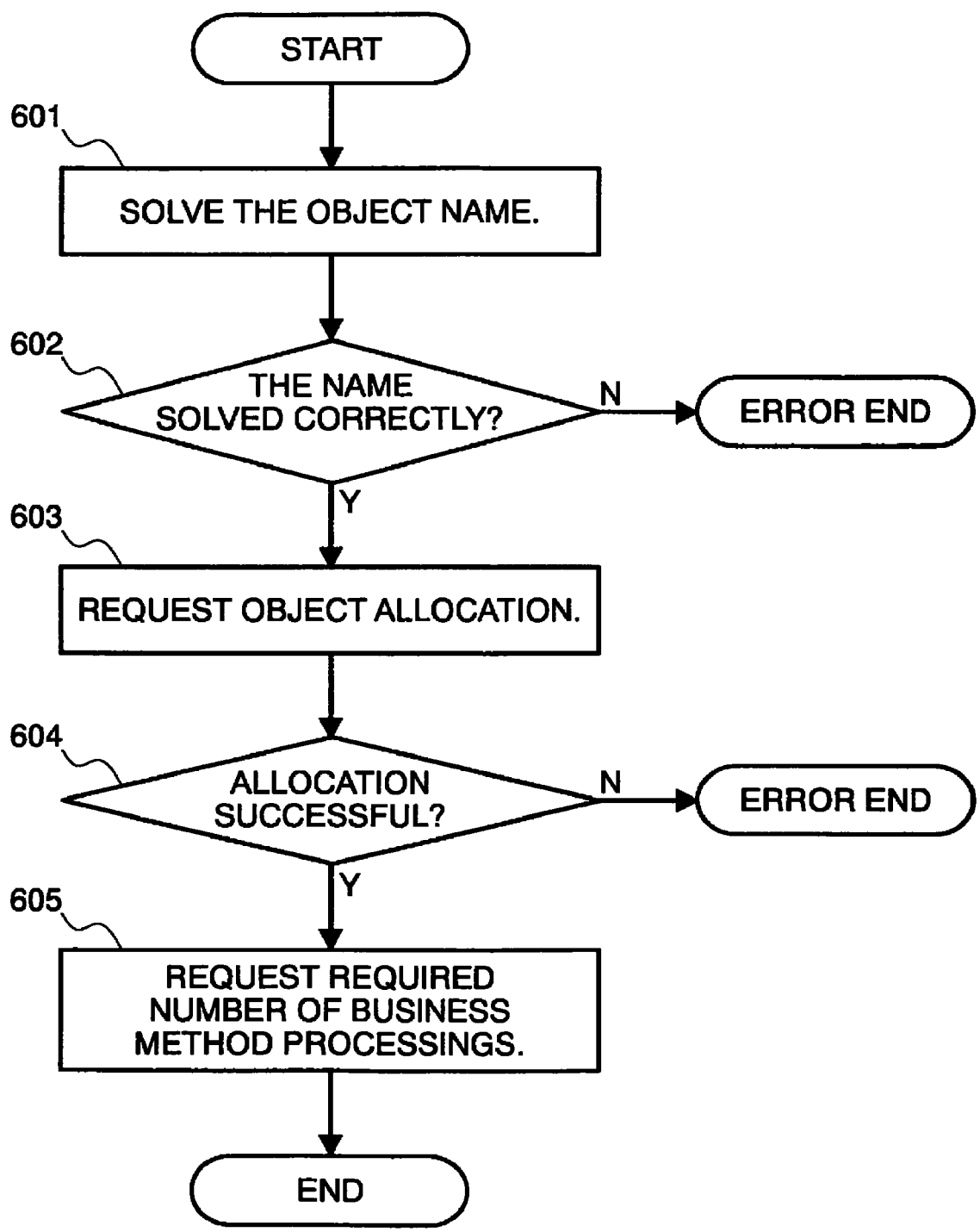
FIG. 6 is a flowchart of the processings of the client side processing apparatus 120 in the embodiment of the present invention.
Figure 7:
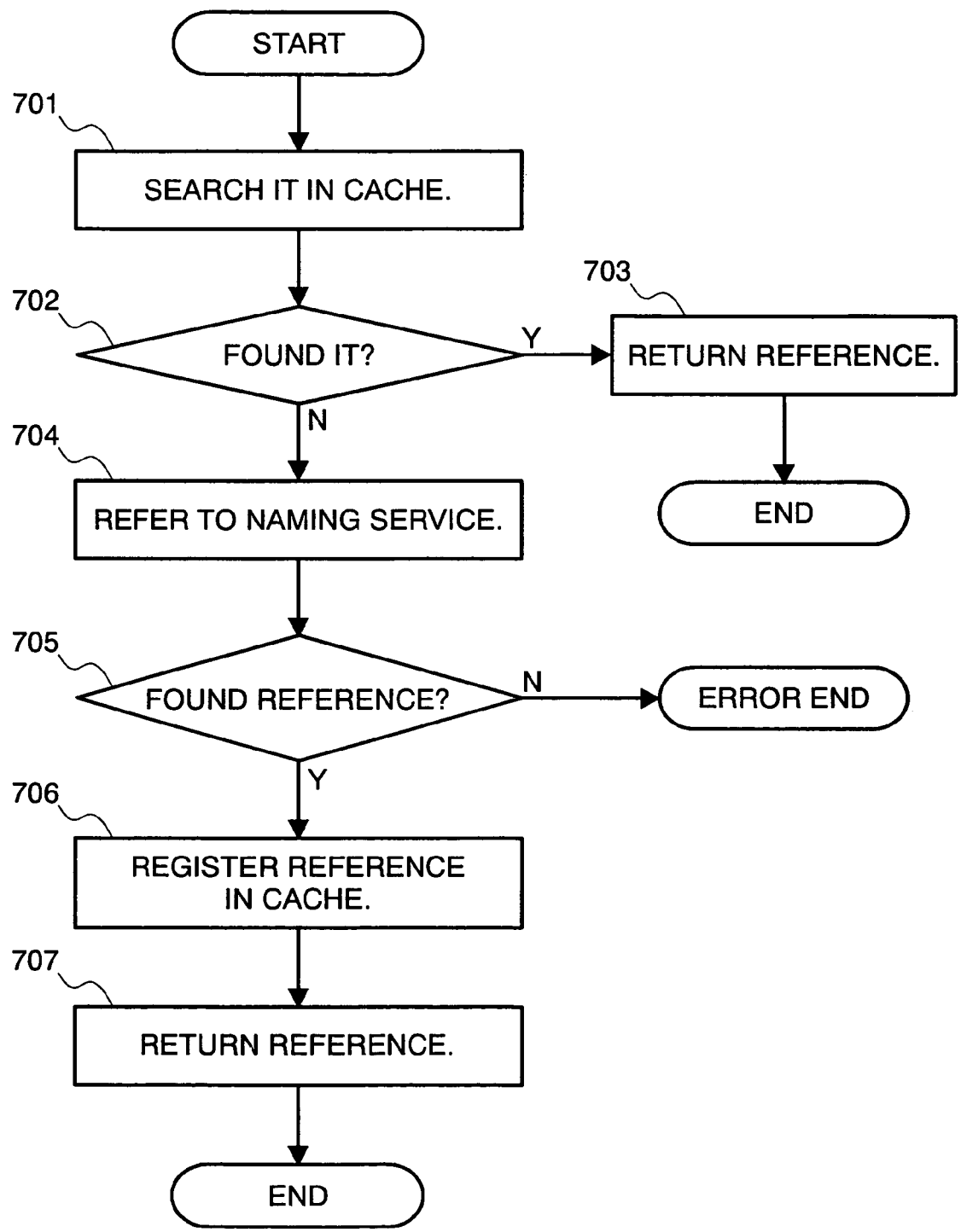
FIG. 7 is a flowchart of the name solving processings of the client side processing apparatus 120 in the embodiment of the present invention.

FIG. 6 shows a flowchart of the processings performed by the client side processing apparatus 120 in this embodiment. In step 601, the name solving part of the client side processing apparatus 120 solves the name of an object as shown in FIG. 7 according to a request for a predetermined object processing in a client program processing.

In step 602, the client side processing apparatus 120 refers to the result of the processing performed in step 601 to check whether or not the name is solved correctly. If the reference to the object allocation controller 102 is included in the processing result and the name is solved correctly, the apparatus 120 goes to step 603. If not, the apparatus 120 ends the processing as an error.

In step 603, the client side processing apparatus 120 sends an object allocation request to the server side processing apparatus denoted by the reference obtained in step 601 through the communication controller and the communication device.

In step 604, the client side processing apparatus 120 receives a processing result with respect to the object allocation request from the server side processing apparatus through the communication controller and the communication device to check whether or not the allocation is made successfully. If the reference to the dispatcher 105 is included in the processing result and the allocation is made successfully, the apparatus 120 goes to step 605. If not, the apparatus 120 ends the processing as an error.

In step 605, the client side processing apparatus 120 issues a necessary number of processing requests for a business method to the server side processing apparatus denoted by the reference received in step 604 through the communication controller and the communication device, and passes the processing result received from the server side processing apparatus to the client program through the communication controller and the communication device.

FIG. 7 shows a flowchart of the object name solving processings performed in the client side processing apparatus 120 in this embodiment. The client side processing apparatus 120 executes the processing as shown in FIG. 7 when the object name solving begins in step 601.

In step 701, the client side processing apparatus 120 refers to a cache that contains both of the object name and the reference to the object allocation controller 102 for allocating the object to search the reference corresponding to the requested object so that the object is processed by the client program.

In step 702, the apparatus 120 checks whether or not the reference corresponding to the processing requested object is found in the cache as a result of the searching. If it is found, the apparatus 120 goes to step 703. If not, the apparatus goes to step 704.

In step 703, the apparatus 120 returns the reference found in the cache to the caller's processing and ends the name solving processing.

On the other hand, in step 704, the apparatus 120 sends an inquiry of whether or not it is possible to solve the requested object name to the naming service part 101 of the server side processing apparatus 100 through the communication controller and the communication device.

In step 705, the apparatus 120 receives a processing result with respect to the inquiry from the server side processing apparatus 100 through the communication controller and the communication device to check whether or not the reference is found. If the reference to the object allocation controller 102 is included in the processing result and the reference is found, the apparatus 120 goes to step 706. If not, the apparatus 120 ends the processing as an error.

In step 706, the apparatus 120 registers the reference received from the server side processing apparatus 100 in the cache, and returns the reference to the caller's processing and ends the name solving processing in step 707.

Next, a description will be made for the processings of a server side processing apparatus to be performed in response to any of an inquiry for object name solving, an object allocation request, and a business method processing request issued from the client side processing apparatus 120 in the program control system in this embodiment. In the processings to be described below, the server side processing apparatus 100 is picked up as an example. However, the server side processing apparatus that will execute the actual distributed object processing is determined by the content of the reference.

Figure 8:
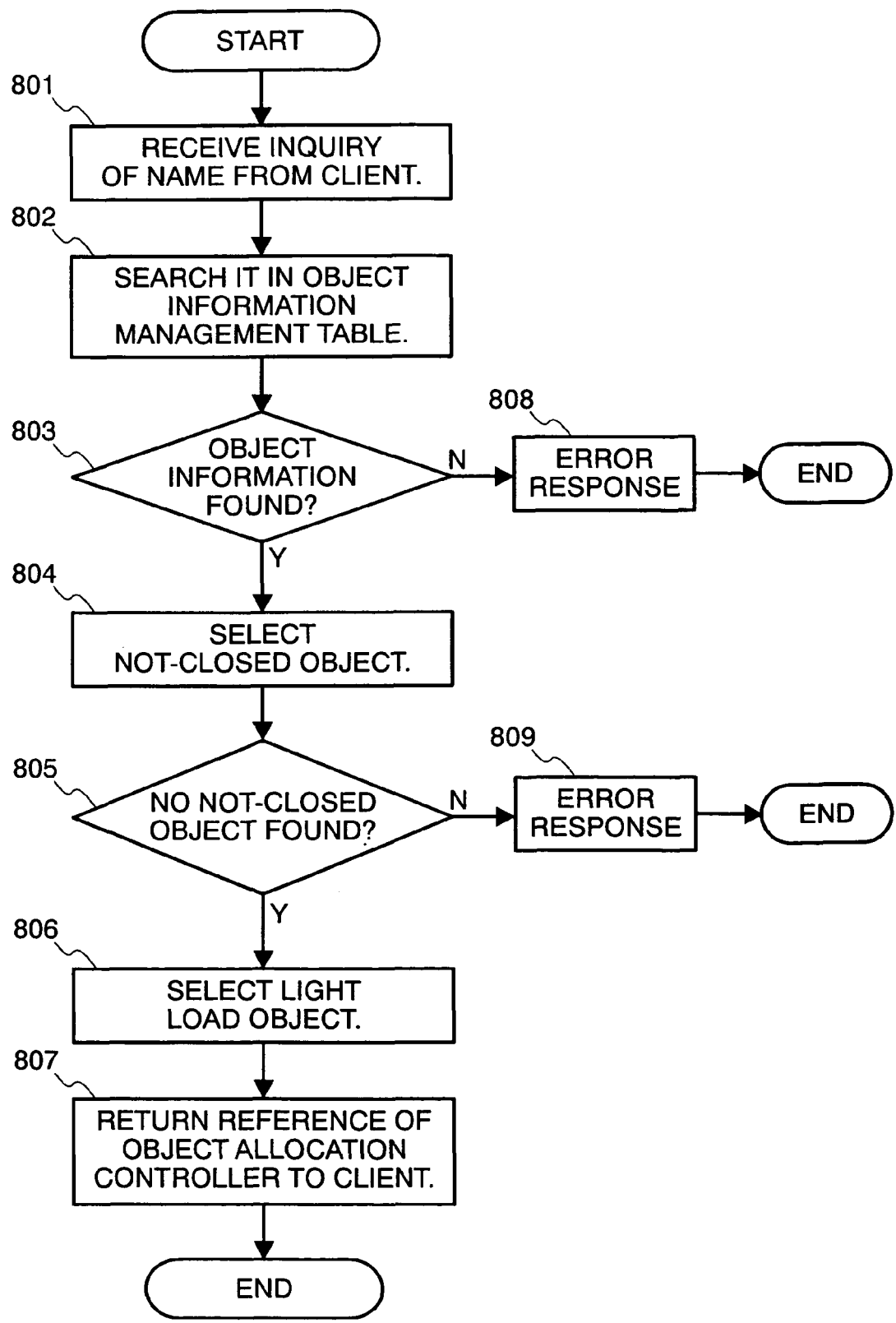
FIG. 8 is a flowchart of the name solving processings of a naming service part 101 in the embodiment of the present invention.

FIG. 8 shows a flowchart of the name solving processings performed by the naming service part 101 of the server side processing apparatus 100 in this embodiment. As shown in FIG. 8, the naming service part 101, when receiving an inquiry about object name solving from the client side processing apparatus 120 in step 704, reads the object information that denotes the load state of each object from the object information management table 107 to select an object having the minimum load or having a load that is lower than a predetermined threshold value, and returns the reference to the object allocation controller 102 that allocates the selected object to the apparatus 120 through the communication device.

In step 801, the naming service part 101 of the server side processing apparatus 100, when receiving an inquiry about object name solving from the client side processing apparatus 120, receives the inquiry through the communication controller 106 and the communication device.

In step 802, the naming service part 101 accesses the object information management table 107 provided in a storage device such as a magnetic disk or the like to search the object information having a registered object name 401 matching with the object name inquired from the client side processing apparatus 120 therein.

In step 803, the naming service part 101 refers to the searching result to check whether or not the inquired object information is found. If it is found, the naming service part 101 goes to step 804.

In step 804, the naming service part 101 selects a not-closed object existing in the object information found in the searching in step 802, that is, an object set at "open" in the blockage state field 405 of the object information, and reads the information of the registered object name 401, the object allocation controller reference 402, the load state 404 from the object information management table 107 with respect to the object respectively, and stores the information in the memory.

In step 805, the naming service part 101 counts the number of registered object names 401 stored in the memory through the processing in step 804 to check whether or not there is any not-closed object. If there is any not-closed object, the naming service part 101 goes to step 806.

In step 806, the naming service part 101 reads the information of the load state 404 stored in the memory in step 804 to select a light load object, that is, an object having the minimum value set in the load state field 404 or having a load value that is lower than a predetermined threshold value.

In step 807, the naming service part 101 reads the object allocation controller reference 402 of the object selected in step 806, that is, the reference to any of the reception processing parts 201 to 203 of the object allocation controller 102, and sends the reference to the client side processing apparatus 120 through the communication controller 106 and the communication device.

On the other hand, the naming service part 101 checks whether or not the object information is found in step 803. If no object information is found, the naming service part 101 goes to step 808 to send an error detection notice as a response to the client side processing apparatus 120 through the communication controller 106 and the communication device.

Furthermore, in step 805, the naming service part 101 checks whether or not any not-closed object exists. If there is no not-closed object, the naming service part 101 goes to step 809 to send an error detection notice as a response to the client side processing apparatus 120 through the communication controller 106 and the communication device.

In the above processings, each object inquired from the client side processing apparatus 120 is searched in the object information management table 107 to solve the object name. However, it is also possible to measure a processing load such as a CPU/memory utilization coefficient when in solving the object name and update the object information in the object information management table 107 for denoting the load state of each object according to the measured processing load values.

Figure 9:
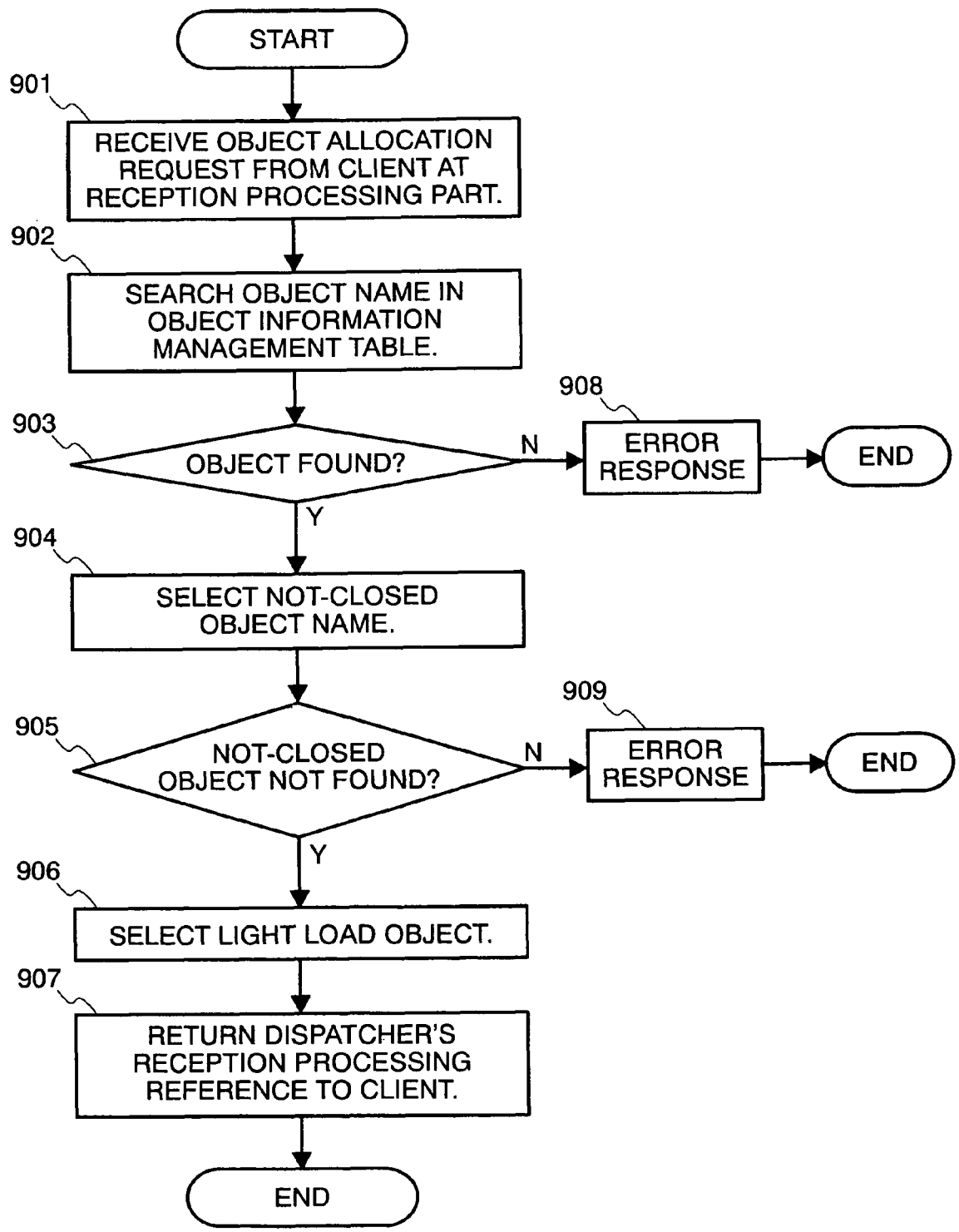
FIG. 9 is a flowchart of the object allocation processings performed in the server side processing apparatus 100 in the embodiment of the present invention.

FIG. 9 shows a flowchart of object allocation processings performed in the server side processing apparatus 100 in this embodiment. As shown in FIG. 9, the object allocation controller 102 of the server side processing apparatus 100, when receiving an object allocation request from the client side processing apparatus 120 in step 603, reads the object information from the object information management table 107 provided in the storage device, and selects an object having the minimum load value or having a load that is lower than a predetermined threshold value, and returns the reference as a response to the dispatcher 105 that executes the selected object to the client side processing apparatus 120 through the communication device.

In step 901, the object allocation controller 102 of the server side processing apparatus 100, when receiving an object allocation request from the client side processing apparatus 120 through the communication controller 106 and the communication device, instructs any of the reception processing parts 201 to 203 to accept the allocation request.

In step 902, the object allocation controller 102 accesses the object information management table 107 provided in the storage device such as a magnetic disk drive or the like to search the object information having a registered object name 401 matching with the name of the allocation requested object name from the client side processing apparatus 120 therein.

In step 903, the object allocation controller 102 refers to the searching result to check whether or not the information of the requested object is found. If the object information is found, the object allocation controller 102 goes to step 904.

In step 904, the object allocation controller 102 selects a not-closed object existing in the object information found in the searching in step 902, that is, an object set for "open" in the blockage state field 405 of the object information, and reads the information of the registered object name 401, the dispatcher reference 403, and the load state 404 with respect to the selected object from the object information management table 107 respectively and store the read information in the memory.

In step 905, the object allocation controller 102 counts the number of objects set in the registered object name 401 stored in the memory in step 904 to check whether or not there is any not-closed object. If there is any, the object allocation controller 102 goes to step 906.

In step 906, the object allocation controller 102 reads the information of the load state 404 stored in the memory in step 904 to select a light load object, that is, an object having the minimum load value or having a load that is lower than a predetermined threshold value.

In step 907, the object allocation controller 102 reads the reference field 403 of the dispatcher of the object selected in step 906 from the memory, that is, the reference to any of the reception processing parts 211 to 213 of the dispatcher 105, and sends the reference as a response to the client side processing apparatus 120 through the communication controller 106 and the communication device.

On the other hand, in step 903, the object allocation controller 102 checks whether or not the object information is found. If the information is not found, the controller 102 goes to step 908 to return the error detection notice to the client side processing apparatus 120 as a response through the communication controller 106 and the communication device.

If it is found that no not-closed object is found as a result of the check in step 905, the object allocation controller 102 sends an error detection notice to the client side processing apparatus 120 as a response through the communication controller 106 and the communication device.

Although the object allocation controller 102 allocates an object requested for allocation from the client side processing apparatus 120 by searching the object information in the object information management table 107, it is also possible to measure the processing load such as the utilization rate of each of the CPU and the memory when the object is allocated, and update the object information in the object information management table 107 that denotes the object load state according to the measured processing loads.

Furthermore, instead of allocating an object requested from the client side processing apparatus 120 by searching the object information in the object information management table 107, it is also possible to allocate such an object by creating it in the container 108. At that time, it is possible to measure such processing loads as the utilization rates of the CPU and the memory when the object is created and update the object information that denotes the object load state in the object information management table 107 according to the measured processing load values.

Figure 10:
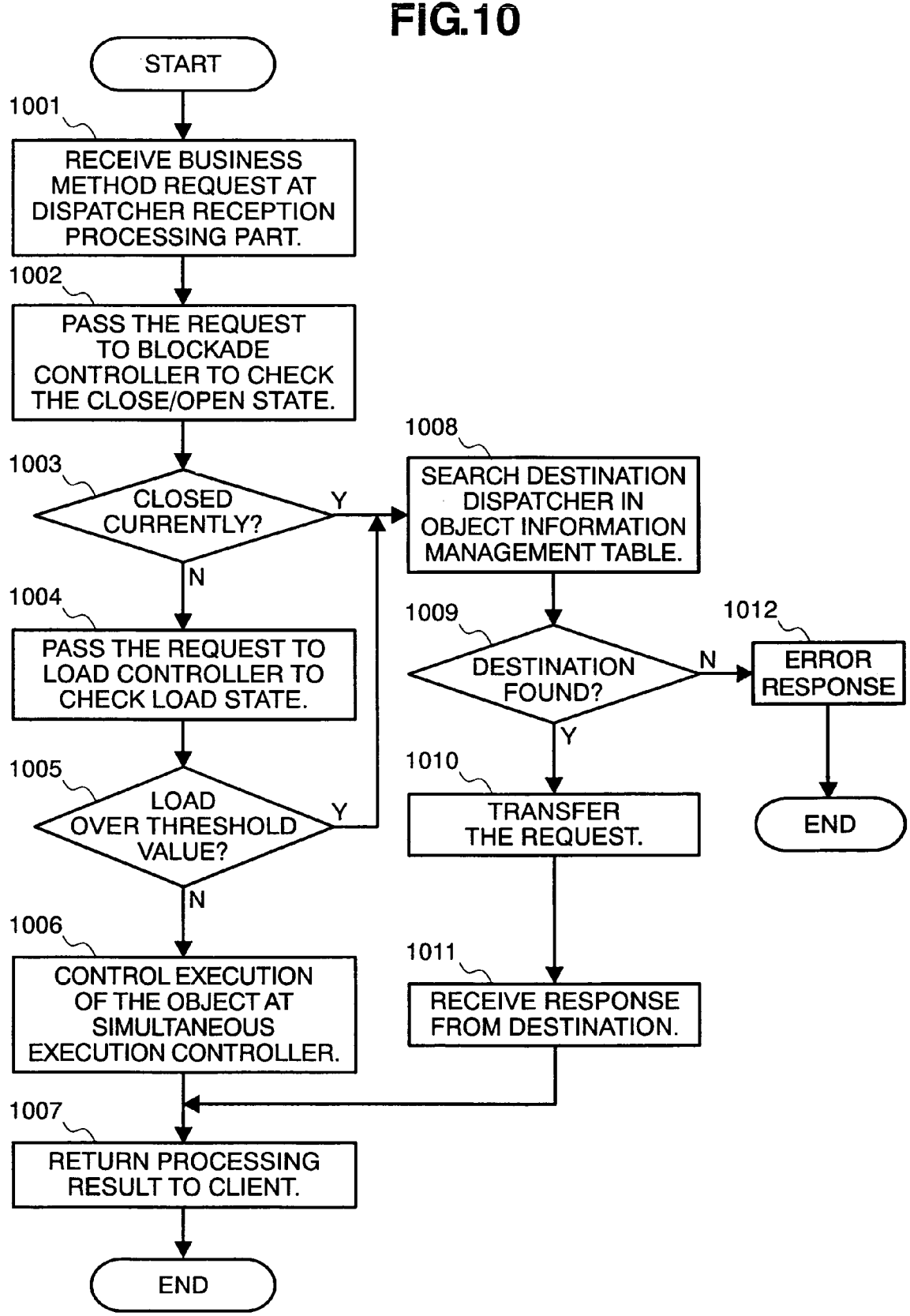
FIG. 10 is a flowchart of the business method request processings performed in the server side processing apparatus 100 in the embodiment of the present invention.

FIG. 10 shows a flowchart of the business method requesting processings performed in the server side processing apparatus 100. As shown in FIG. 10, the dispatcher 105 of the server side processing apparatus 100, when receiving a request for processing a predetermined object method such as a business method that supplies a predetermined business related service supply business method from the client side processing apparatus 120 in step 605 or when receiving such a request transferred from another server side processing apparatus, reads the object information from the object information management table 107 provided in the storage device to call the object method when the load is under a predetermined threshold value, and sends the processing result to the client side processing apparatus 120 through the communication device as a response.

In step 1001, the dispatcher 105 of the server side processing apparatus 100, when receiving a business method request from the client side processing apparatus 120 or when receiving such a request transferred from a different server side processing apparatus through the communication controller 106 and the communication device, accepts the request through any of the reception processing parts 211 to 213.

In step 1002, the dispatcher 105 passes the request to the blockade controller 215 to instruct the controller 215 to check the blockage state 405. Receiving the instruction, the blockage controller 215 accesses the object information management table 107 provided in the storage device to search the object information having a registered object name 401 matching the object name requested from the client side processing apparatus 120, and reads the information of the blockage state 405 set in the searched object information.

In step 1003, the dispatcher 105 refers to the read blockage state 405 to check whether or not the requested object is currently closed. If the object is not closed, the dispatcher 105 goes to step 1004.

In step 1004, the dispatcher 105 passes the request to the load controller 214 so that the load controller 214 checks the load state 404. The load controller 214 thus accesses the object information management table 107 provided in the storage device such as a magnetic disk to read the load state 404 set in the object information searched in step 1002.

In step 1005, the dispatcher 105 checks whether or not the value of the read load state 404 is over a predetermined threshold value. If the value is under the threshold value, the dispatcher 105 goes to step 1006. At that time, the dispatcher 105 may also select an object having the minimum value of the load state 404, and go to step 1006.

In step 1006, the dispatcher 105 instructs the simultaneous execution controller 217 to execute the object and the simultaneous execution controller 217 controls the object execution according to the execution control information set in the execution control information table 500, and holds the processing result in the memory.

In step 1007, the dispatcher 105 reads the processing result from the memory to send the result to the client side processing apparatus 120 and other server side processing apparatuses through the communication controller 106 and the communication device.

On the other hand, the dispatcher 105 checks whether or not the object is closed currently in step 1003 and whether or not the value of the load state 404 is over a predetermined threshold value in step 1005. If the object is closed and the value is over the threshold value, the dispatcher 105 goes to step 1008.

In step 1008, the dispatcher 105 accesses the object information management table 107 provided in the memory such as a magnetic disk drive to search object information in the object information management table 107. The object information to be searched here is different from the object information searched in step 1002. The object information searched in the table 107 is included in the object information having a registered object name 401 matching the object name requested from the client side processing apparatus 120. The dispatcher 105 then reads the dispatcher reference 403 set in the searched object information as the information of the destination dispatcher.

In step 1009, the dispatcher 105 checks whether or not the dispatcher reference 403 of the destination dispatcher is found in the above searching. If the reference 403 is found and there is a destination dispatcher, the dispatcher 105 goes to step 1010.

In step 1010, the dispatcher 105 transfers the request to a different server side processing apparatus identified by the searched dispatcher reference 403 through the communication controller 106 and the communication device.

In step 1011, the dispatcher 105 receives a response from the destination server side processing apparatus through the communication controller 106 and the communication device. The response includes the request processing result. The dispatcher 105 then holds the processing result in the memory and goes to step 1007.

On the other hand, in step 1009, the dispatcher 105 checks whether or not the dispatcher reference 403 of the destination dispatcher is found. If the reference 403 is not found and there is no destination dispatcher, the dispatcher 105 goes to step 1012 to send an error detection notice to the client side processing apparatus 120 as a response through the communication controller 106 and the communication device.

Figure 11:
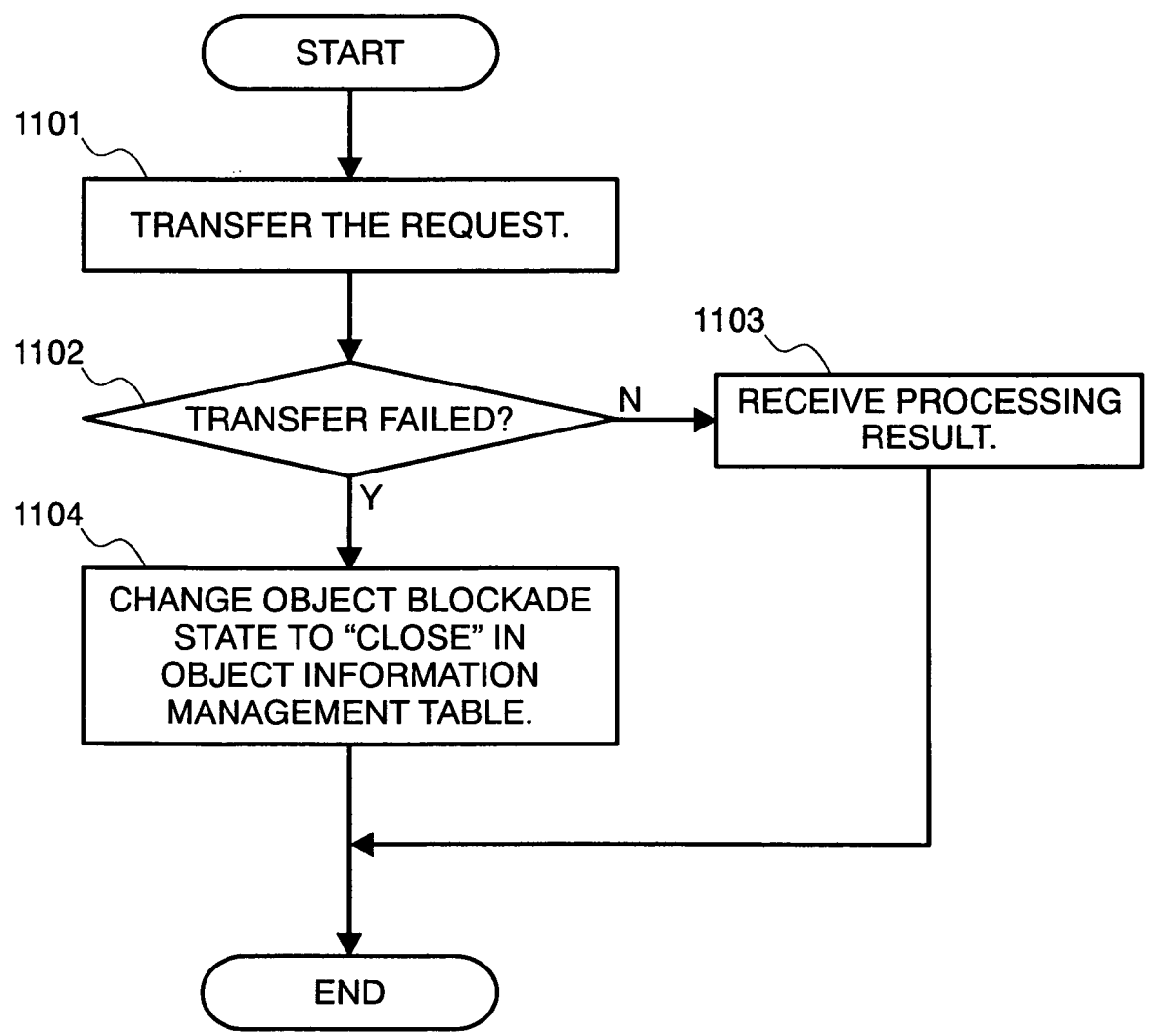
FIG. 11 is a flowchart of the business method request transfer processings in the embodiment of the present invention.

FIG. 11 is a flowchart of the business method request transfer processings, which are equivalent to those in step 1010 in this embodiment. As shown in FIG. 11, the transfer controller 216 of the server side processing apparatus 100, if the object is found to be closed currently in step 1003 and/or if the value of the load state 404 is found to be over the predetermined threshold value in step 1005, transfers the request to a different dispatcher that is to execute the object through the communication device.

In step 1101, the transfer controller 216 of the server side processing apparatus 100 transfers the request to a different server side processing apparatus identified by the dispatcher reference 403 through the communication controller 106 and the communication device.

In step 1102, the dispatcher 105 receives a response from the destination server side processing apparatus through the communication controller 106 and the communication device, and checks whether or not the response is an error notice. If the transfer is successful, the dispatcher 105 goes to step 1103 to receive the processing result that follows the response, and holds the processing result in the memory.

If the transfer is found to be failed in step 1102, the dispatcher 105 goes to step 1104 to access the object information management table 107 provided in the memory such as a magnetic disk drive to search the object information having a dispatcher reference 403 matching with the reference used for transferring the request therein, and changes the blockage state 405 in the searched object information to "close".

Figure 12:
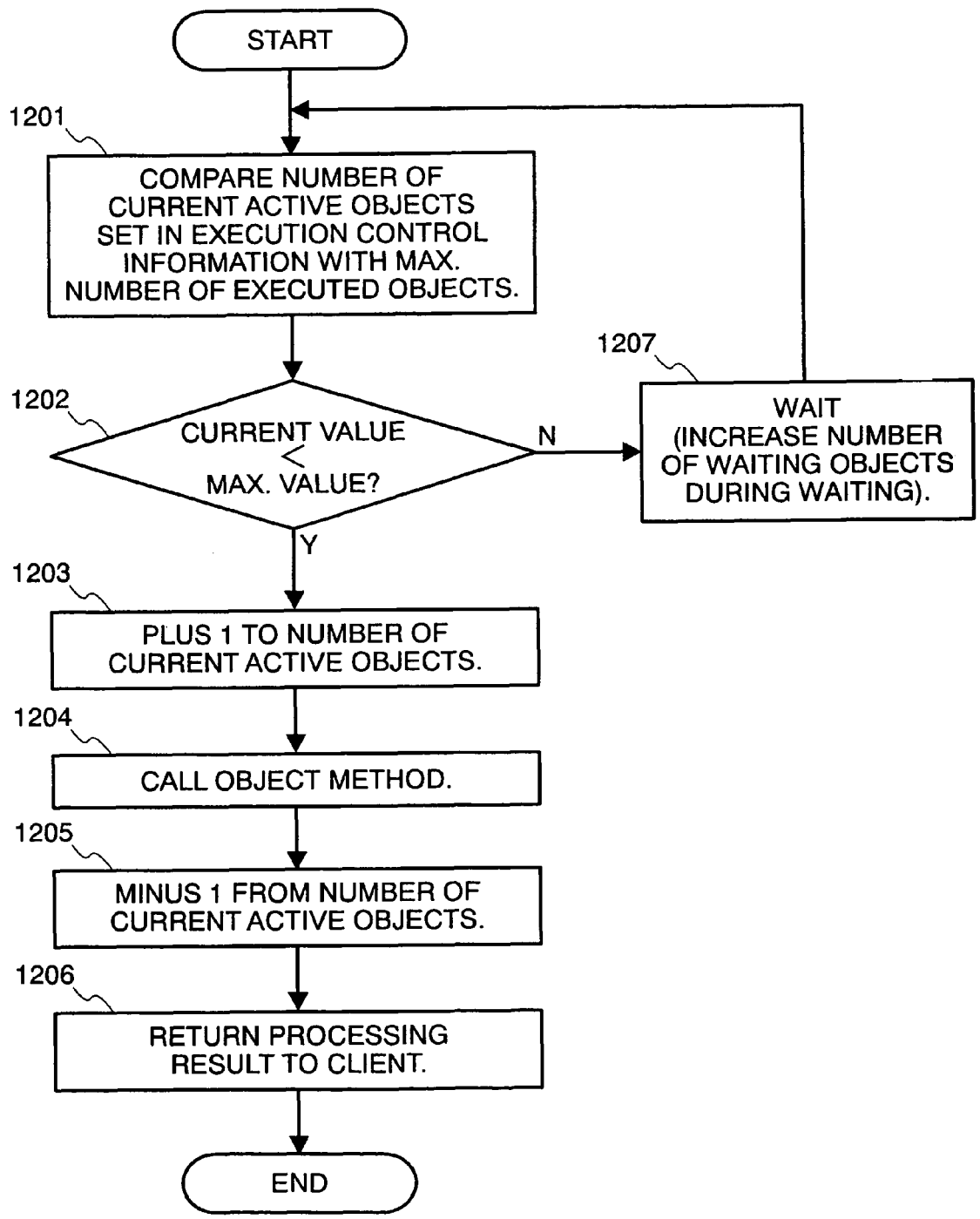
FIG. 12 is a flowchart of the simultaneous execution controlling processings in the embodiment of the present invention.

FIG. 12 shows a flowchart of simultaneous execution control processings in this embodiment. As shown in FIG. 12, the simultaneous execution controller 217 of the server side processing apparatus 100 controls simultaneous execution of a plurality of objects.

In step 1201, the simultaneous execution controller 217 of the server side processing apparatus 100 accesses the execution control information table 500 provided in such a memory as a magnetic disk drive to search the execution control information having an object name matching with the object name requested from the client side processing apparatus 120 therein. The simultaneous execution controller 217 then compares the number of current active objects in the searched execution control information with the maximum number of executed objects read from the execution control information table 500.

In step 1202, the simultaneous execution controller 217 checks the result of comparison. If the number of current active objects set in the searched execution control information is under the maximum number of executed objects, the simultaneous execution controller 217 goes to step 1203. If not, the simultaneous execution controller 217 goes to step 1207.

In step 1203, the simultaneous execution controller 217 reads the number of current active objects in the searched execution control information and adds "1" to the result, and stores the updated value (number of current active objects) in the execution control information table 500.

In step 1204, the simultaneous execution controller 217 calls the object method requested from the client side processing apparatus 120 to use the method to execute a predetermined processing. At that time, the simultaneous execution controller 217 may also measure such processing loads as utilization rates of both CPU and memory required for executing the object, and update the object information that denotes the object load state in the object information management table 107 according to the measured load values.

In step 1205, the simultaneous execution controller 217 reads the number of current active objects stored in the execution control information table 500 previously and subtracts "1" from the number of current active objects and stores the updated value (number of current active objects) in the execution control information table 500.

In step 1206, the simultaneous execution controller 217 holds the processing result obtained in step 1204 in the memory, thereby passing the processing result to the dispatcher 105 and returning the processing result to the client side processing apparatus 120.

On the other hand, if the number of current active objects is found not under the maximum number of executed objects, the simultaneous execution controller 217 goes to step 1207 to wait for a predetermined time. During the waiting, the number of waiting objects is assumed to be increased by "1" in the execution control information searched in step 1201.

Figure 13:
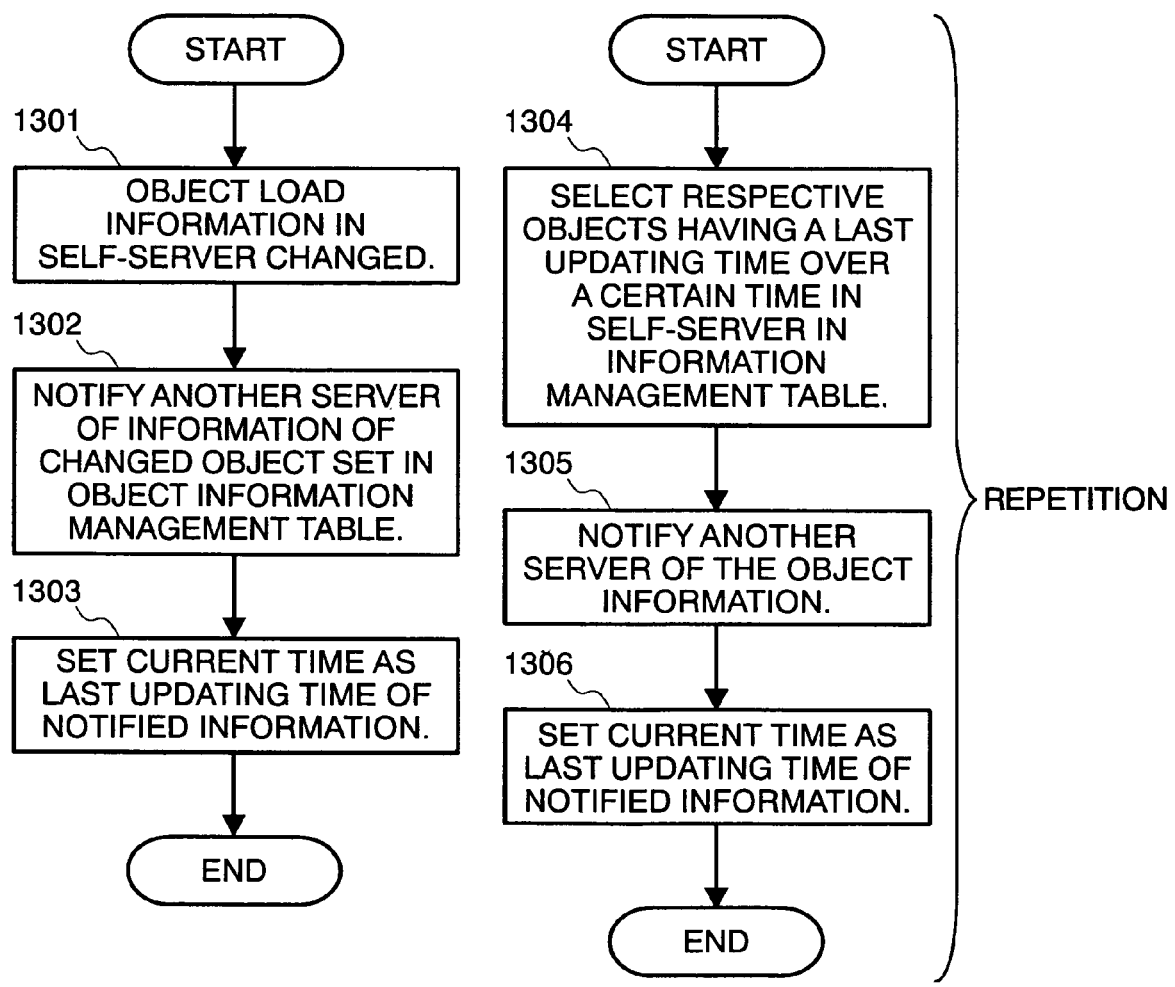
FIG. 13 is a flowchart of the object information load state notifying processings in the embodiment of the present invention.

FIG. 13 shows a flowchart of object information load state notifying processings in this embodiment. As shown in FIG. 13, the object information sharing controller 103 of the server side processing apparatus 100, if the load state 404 changes and/or a predetermined time passes by after the last updating time 406, reads the object information from the object information management table 107 provided in the storage device, and sends the information to another server side processing apparatus through the communication device.

In step 1301, the object information sharing controller 103 of the server side processing apparatus 100 measures the load information such as the utilization rates of both CPU and memory at predetermined time intervals to compare each measured value with the information of the load state 404 in the object information management table 107 to check whether or not a difference is found between them, thereby detecting a change of the object load of the self-server side processing apparatus.

In step 1302, the object information sharing controller 103 sends the changed object information to another server side processing apparatus such as the server side processing apparatus 110 through the communication controller 106 and the communication device.

In step 1303, the object information sharing controller 103 sets the current time in the last updating time field 406 of the notified object information, and stores the current time in the object information management table 107.

In step 1304, the object information sharing controller 103 of the server side processing apparatus 100 reads the object information items related to the self-server side processing apparatus from the object information management table 107 to select object information items having the last updating time 406 over a predetermined time respectively from among them.

In step 1305, the object information sharing controller 103 notifies the selected object information to a different server side processing apparatus such as the server side processing apparatus 110 through the communication controller 106 and the communication device.

In step 1306, the object information sharing controller 103 sets the current time for the last updating time 406 in the notified object information, and stores the current time in the object information management table 107.

Figure 14:
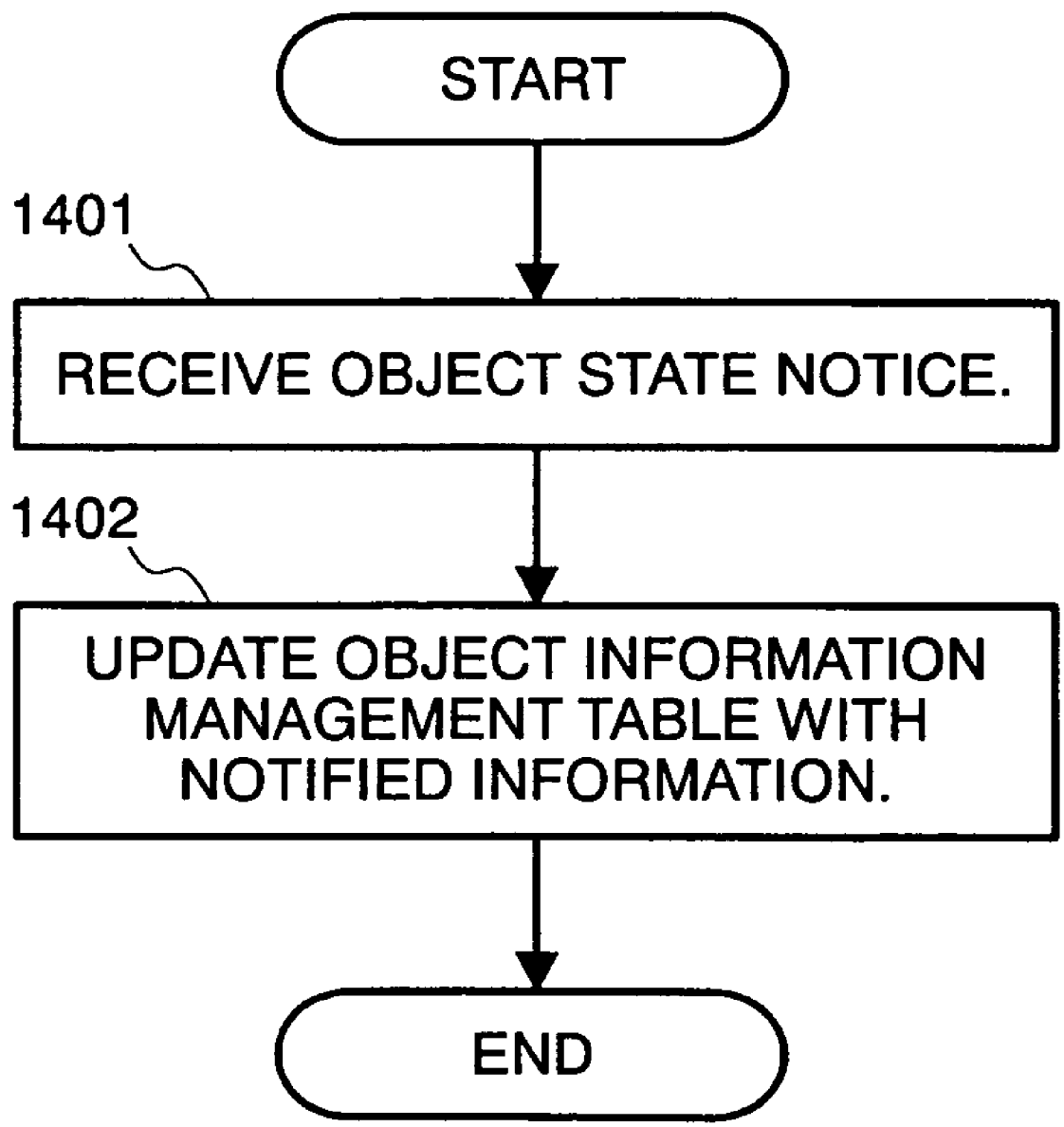
FIG. 14 is a flowchart of the processings for updating the object load and/or blockage state change with notified information in the embodiment of the present invention.

FIG. 14 shows a flowchart of processings for updating the object information with the notified object load/blockage state change in this embodiment. As shown in FIG. 14, the object information sharing controller 103 of the server side processing apparatus 100 updates the object information management table 107 provided in the storage device with the object information notified from the different server side processing apparatus.

In step 1401, the object information sharing controller 103 of the server side processing apparatus 100 receives an object state notice from the different server side processing apparatus such as the server side processing apparatus 110 through the communication controller 106 and the communication device.

In step 1402, the object information sharing controller 103 accesses the object information management table 107 provided in the storage device such as a magnetic disk drive to search the object information having the address information of the server side processing apparatus set in the dispatcher reference 403 therein, which matches with the address information of the server side processing apparatus that is the source of the object state notice, and reads the searched object information. The object information sharing controller 103 then updates the read object information with the notified information and stores the updated object information in the object information management table 107.

As described above, the program control system in this embodiment, if the load state changes just like in steps 1301 to 1303 in FIG. 13, notifies the object information to other different server side processing apparatuses to update the original information respectively with the notified information as shown in FIG. 14. Each server side processing apparatus in the system can thus execute distributed object processings efficiently according to the load state.

Figure 15:
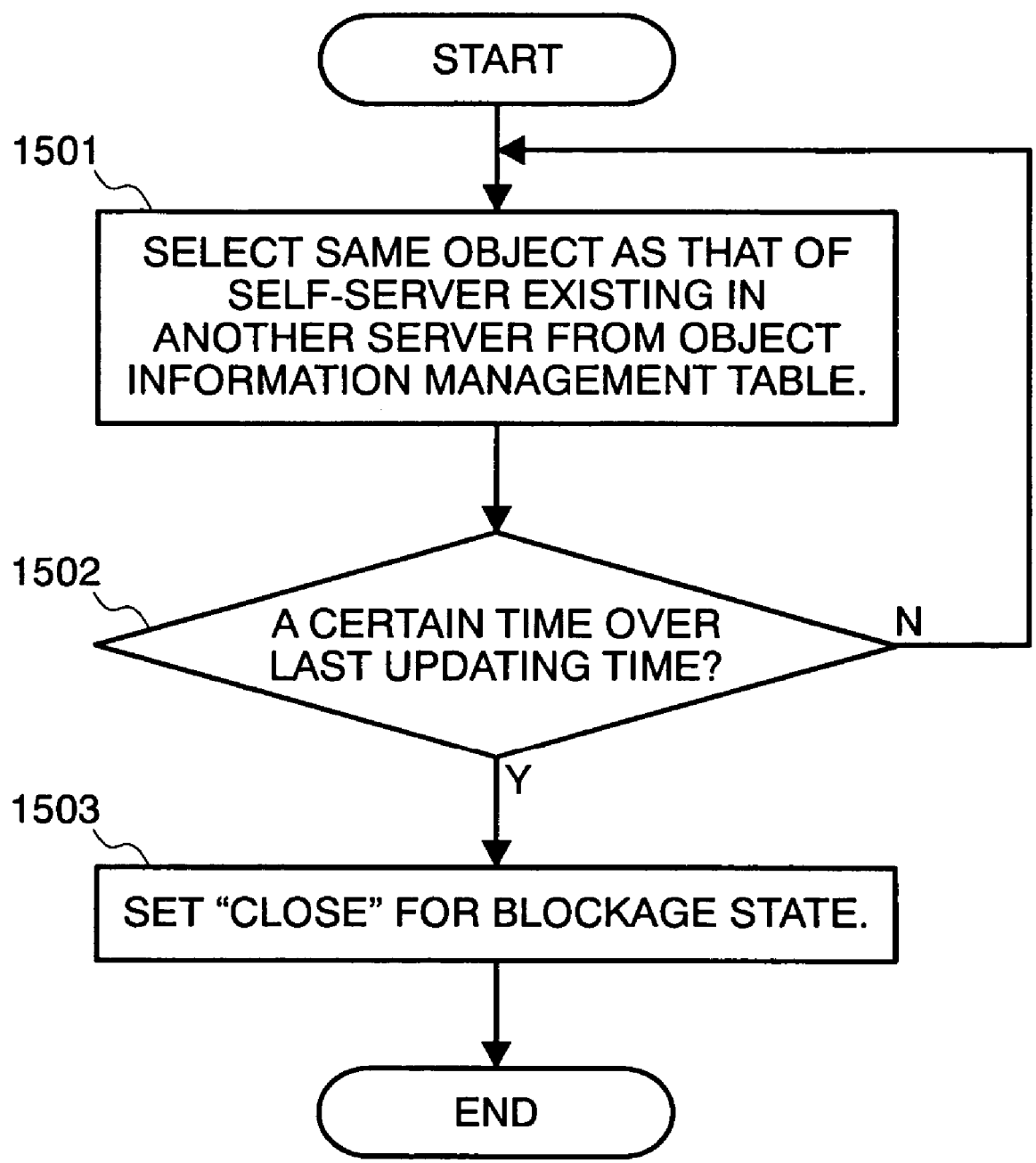
FIG. 15 is a flowchart of error detection processings in another server in the embodiment of the present invention.

FIG. 15 shows a flowchart of processings for detecting errors in another different server. As shown in FIG. 15, the monitoring part 104 of the server side processing apparatus 100 monitors the operation state of each of other server side processing apparatuses to detect errors to occur therein.

In step 1501, the monitoring part 104 of the server side processing apparatus 100 selects the same object as that of the self server side processing apparatus, which exists in a different server side processing apparatus, from the object information management table 107.

In step 1502, the monitoring part 104 reads the last updating time set in the information of the selected object to check whether or not a predetermined time passes by after the last updating time 406. If the check result is YES (passes by), the monitoring part 104 goes to step 1503.

In step 1503, the monitoring part 104 changes the blockage state 405 set in the information of the selected object to "close".

As described above, the program control system in this embodiment, if a predetermined time passes by after the last updating time 406 just like in steps 1304 to 1306 in FIG. 13, notifies the object information to other server side processing apparatuses to update the original information respectively with the notified information as shown in FIG. 14. Each server side processing apparatus in the system can thus determine each object that is not notified even when a predetermined time passes by after the last updating time 406 to be closed just like in steps 1501 to 1503 in FIG. 15, thereby the server side processing apparatus can execute distributed object processings efficiently according to the blockage state.

Figure 16:
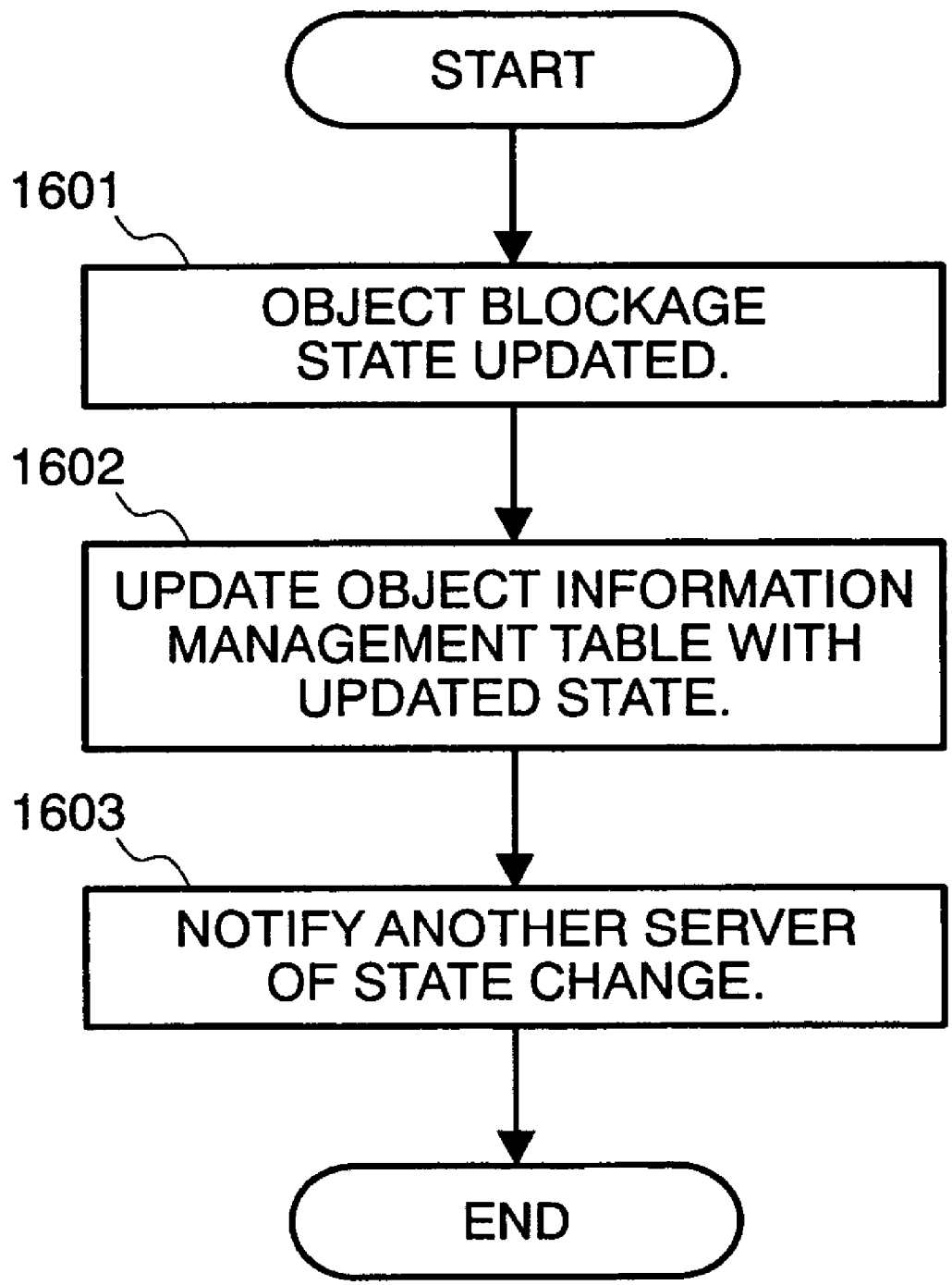
FIG. 16 is a flowchart of the object blockage state change notifying processings in the embodiment of the present invention.

FIG. 16 shows a flowchart of processings for notifying a blockage state change of an object in this embodiment. As shown in FIG. 16, the object information sharing controller 103 of the server side processing apparatus 100, when the blockage state 405 of an object changes, reads the object information from the object information management table 107 provided in the storage device and notifies the information to other server side processing apparatuses through the communication device respectively.

In step 1601, the object information sharing controller 103 of the server side processing apparatus 100, when receiving an object blockage state instruction from a user through an input device and the object blockage state changes, accepts the changed blockage state through the input device.

In step 1602, the object information sharing controller 103 accesses the object information management table 107 provided in the storage device such as a magnetic disk drive to search the object information having a registered object name 401 matching with the name of the object of which blockage state changes, and stores the changed state in the blockage state field 405 in the searched object information.

In step 1603, the object information sharing controller 103 notifies the object information having the changed blockage state 405 to other server side processing apparatuses through the communication controller 106 and the communication device respectively.

As described above, the program control system in this embodiment, if the blockage state of an object changes as instructed from a user, notifies the object information to each of other server side processing apparatuses. Each server side processing apparatus in the system can thus execute distributed object processings efficiently according to the updated blockage state.

As described above, each of the server side processing apparatus 100 and 110 processes inquiries and requests from the client side processing apparatus 120, returns the object allocation controller reference 402 and dispatcher reference 403 to the destination, and executes objects according to their one-dimensionally managed object information items to control program execution in each distributed object processing. However, a front end server dedicated to load distribution processings may be provided so that this front end server returns the object allocation controller reference 402 and the dispatcher reference 403.

Figure 17:
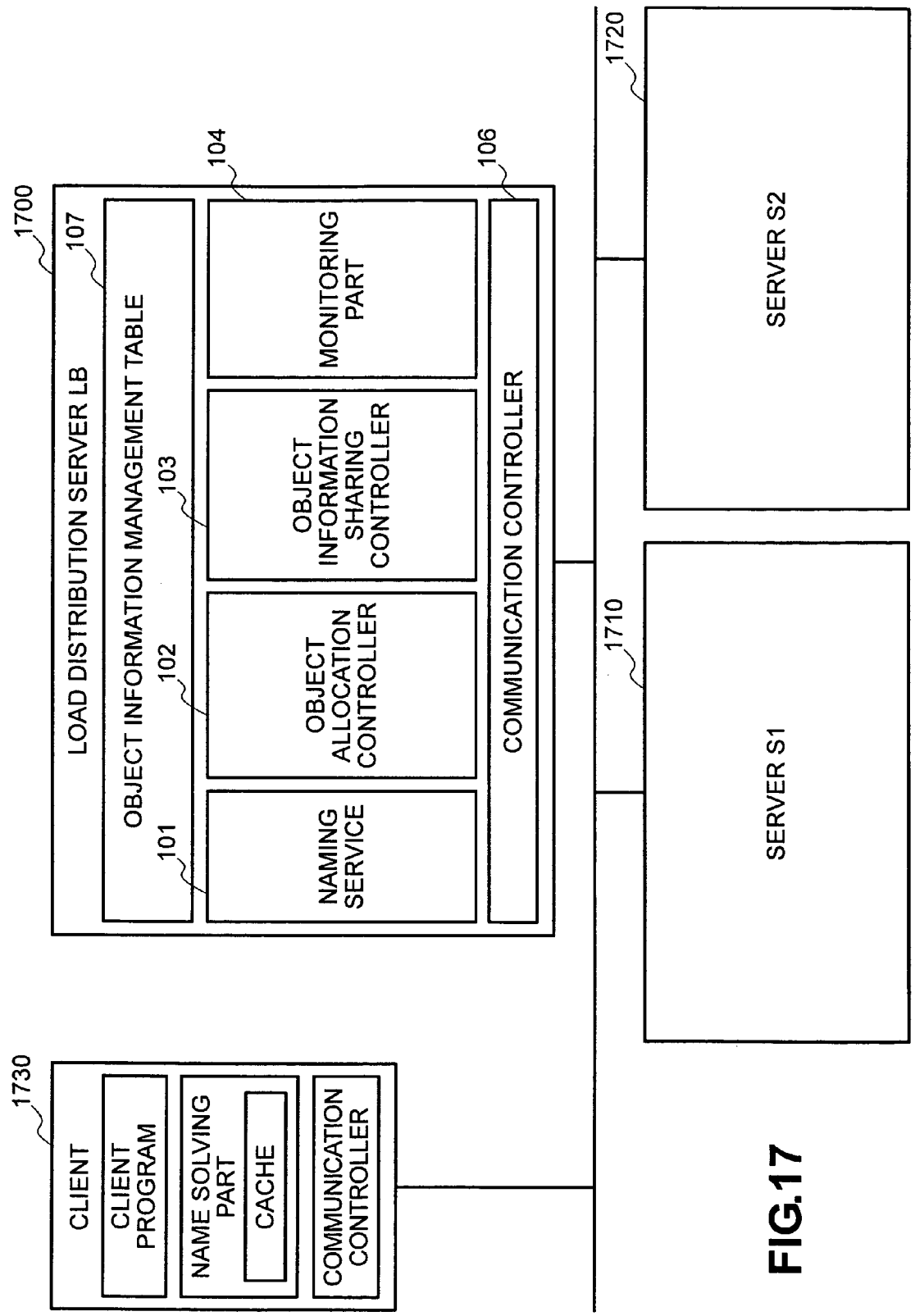
FIG. 17 is an overall block diagram of a system that employs a front end server dedicated to load distribution in the embodiment of the present invention.

FIG. 17 shows an overall block diagram of the program control system that uses such a front end server dedicated for load distribution processings in this embodiment. As shown in FIG. 17, the program control system in this embodiment includes a load distribution server LB 1700, server side processing apparatuses 1710 and 1720, and a client side processing apparatus 1730.

The load distribution server LB 1700 processes inquiries and processing requests received from the client side processing apparatus 1730 and returns the object allocation controller reference and the dispatcher reference according to the one-dimensionally managed object information to control program execution in each distributed object processing.

Each of the server side processing apparatuses 1710 and 1720 is an information processing apparatus that executes each object in response to a processing request received from the client side processing apparatus. The client side processing apparatus 1730 is an information processing apparatus that issues inquiries and processing requests to the load distribution server LB 1700 and receives the object allocation controller reference and the dispatcher reference therefrom, as well as issues processing requests to the server side processing apparatus 1710 or 1720 and receives the object execution result therefrom.

Figure 18:
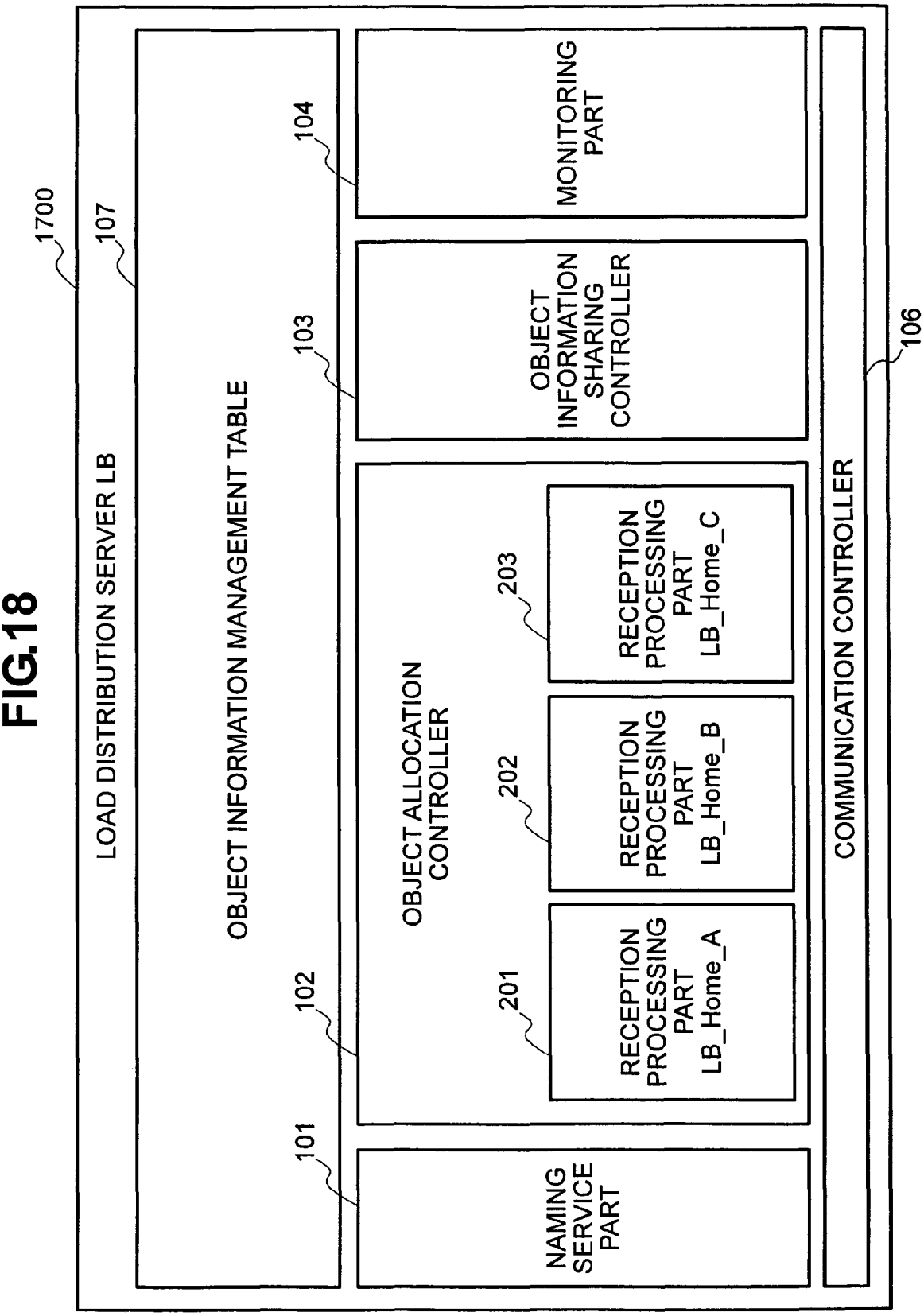
FIG. 18 is an internal block diagram of a load distribution server LB1700 in the embodiment of the present invention.

FIG. 18 shows an internal block diagram of a load distribution server LB 1700 in this embodiment. As shown in FIG. 18, the configuration of the load distribution server LB 1700 is the same as the server side processing apparatus 100 shown in FIG. 2 except for the inclusion of the dispatcher 105 and the container 108.

FIG. 19 shows an example of the object information management table 107 employed when the load distribution server LB 1700 in this embodiment is used. As shown in FIG. 19, the configuration of the object information management table 107 is the same as that of the server side processing apparatus 100 shown in FIG. 4 when the load distribution server LB 1700 is used. When the load distribution server LB 1700 is used, however, the object information includes an added object information item that contains the reference to the object allocation controller 102 provided in the load distribution server LB 1700.

Figure 20:
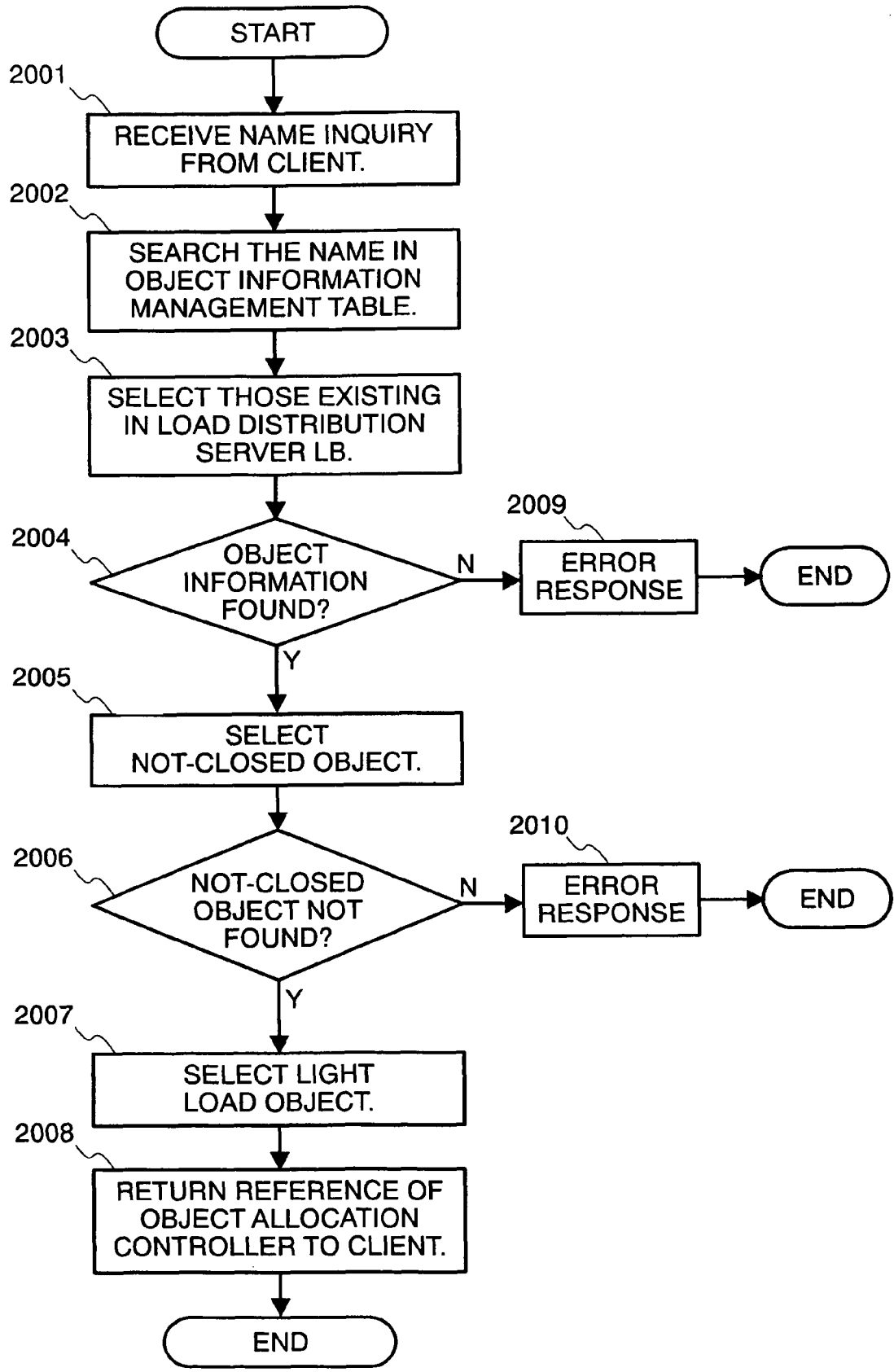
FIG. 20 is a flowchart of the name solving processings performed in the naming service part 101 of the load distribution server LB in the embodiment of the present invention.

FIG. 20 shows a flowchart of the name solving processings performed in the naming service part 101 provided in the load distribution server LB in this embodiment. As shown in FIG. 20, the naming service part 101 of the load distribution server LB 1700, when solving an object name, reads the object information that denotes the load state of the object from the object information management table 107 provided in the storage device to select an object having the minimum load or having a load that is lower than a predetermined threshold value, and returns the reference to the object allocation controller 102 of the load distribution server LB 1700 that allocates the selected object through a communication device as follows.

In step 2001, the naming service part 101 of the load distribution server LB 1700, when receiving an inquiry for solving an object name from the client side processing apparatus 1730, receives the name solving inquiry through the communication controller 106 and the communication device.

In step 2002, the naming service part 101 accesses the object information management table 107 provided in a storage device such as a magnetic disk drive to search each object information having a registered object name 401 matching the object name inquired from the client side processing apparatus 1730 therein.

In step 2003, the naming service part 101 selects the object information having an object allocation controller reference 402 that denotes the object allocation controller 102 provided in the load distribution server LB 1700.

In step 2004, the naming service part 101 refers to the selection result to check whether or not the object information inquired by the client side processing apparatus 1730 is found. If the information is found, the naming service part 101 goes to step 2005.

In step 2005, the naming service part 101 selects a not-closed object existing in the object information selected in step 2003, that is, an object set in the "open" state in the blockage state field 405 of the searched object information, and reads the information of the registered object name 401, the object allocation controller reference 402, and the load state 404 with respect to the object from the object information management table 107, and stores the information in the memory.

In step 2006, the naming service part 101 counts the number of registered object names in the field 401 stored in the memory in step 2005 to check whether or not there is any not-closed object. If there is any not-closed object, the naming service part 101 goes to step 2007.

In step 2007, the naming service part 101 reads the information in the load state field 404 stored in the memory in step 2005 to select a light load object, that is, an object having the minimum value in the load state field 404 or having a load that is lower than a predetermined threshold value.

In step 2008, the naming service part 101 reads the object allocation controller reference 402 of the object selected in step 2007, that is, the reference to any of the reception processing parts 201 to 203 of the object allocation controller 102 provided in the load distribution server LB 1700 from the memory, and sends the reference to the client side processing apparatus 1730 through the communication controller 106 and the communication device.

On the other hand, if the object information is not found as a result of the check in step 2004, the naming service part 101 goes to step 2009 to send an error detection notice to the client side processing apparatus 1730 as a response through the communication controller 106 and the communication device.

If there is no not-closed object in the check in step 2006, the naming service part 101 goes to step 2010 to send an error detection notice to the client side processing apparatus 1730 as a response through the communication controller 106 and the communication device.

The object allocation processing and the business method request processing that come after that processing are the same as those performed in the configuration in FIG. 1, which does not use the load distribution server LB 1700.

As described above, the program controller in this embodiment, when executing a distributed object processing, returns an object allocation controller reference and a dispatcher reference as responses, as well as executes the object according to the one-dimensionally managed object information. The program controller can thus execute each distributed object processing efficiently in accordance with the load state at that time.

The foregoing invention has been described in terms of preferred embodiments. However, those skilled, in the art will recognize that many variations of such embodiments exist. Such variations are intended to be within the scope of the present invention and the appended claims.

The invention claimed is:

1. A program control system for controlling program execution in a distributed object processing, comprising:
   a computer-readable storage memory device having computer-executable instructions tangibly embodied thereon;
   a first program control device; and
   a second program control device,
   wherein the computer-executable instructions cause a processor to perform steps implemented by the first program control device and the second program control device,
   wherein the first program control device implements steps performed by:
   a first naming service part for, when receiving a request for solving an object name, reading object information that denotes a load state of an object from a storage means to select an object having a load that is less than a predetermined threshold value, and returning a reference of a first object allocation control part that allocates the selected object to a destination as a response;
   the first object allocation control part for, when a request to allocate the object that is identified by the reference is received, reading the object information from the storage means to select the object requested by the request to allocate the object and having a load that is less than the predetermined threshold value, and returning a reference of a dispatcher that executes the selected object to the destination as a response; and
   a first dispatcher for, when the dispatcher identified by the reference of the dispatcher receives a request for processing the object, reading the object information corresponding to the object from the storage means to execute the object if the object load is less than the predetermined threshold value, and returning a processing result to the destination as a response means;
   a first object information sharing control part for reading the object information from the storage means to notify the object information to the second program control device, and wherein the second program control device includes:
   a second object information sharing control part for receiving the notified object information to update the object information stored in the storage means;
   a second naming service part for, in solving an object name, reading the updated object information to select an object having a load that is less than the predetermined threshold value, and returning a reference of second object allocation control part that allocates the selected object to the destination as a response;
   the second object allocation control part for, when a request to allocate the object that is identified by the reference is received, reading the updated object information corresponding to the object from the storage means to select the object having a load that is less than the predetermined threshold value, and returning a reference of a dispatcher that executes the selected object to the destination as a response; and
   a second dispatcher for, in executing the object, reading the updated object information corresponding to the object from the storage means to execute the object if the object has a load that is less than the predetermined threshold value, and returning a processing result to the destination as a response.

2. A product comprising:
   a recording medium having computer-executable instructions tangibly embodied thereon,
   wherein the computer-executable instructions cause a processor to perform the steps of:
   when receiving a request for solving an object name in the first program control device, reading object information that denotes a load state of an object from a storage means of the first program control device to select the object having a load that is less than a predetermined threshold value, and returning a reference of an object allocation control part that allocates the selected object to a destination as a response;
   when the object allocation control part receives a request to allocate the object that is identified by the reference in the first program control device, reading the object information from the storage means of the first program control device to select the object requested by the request to allocate the object and having a load that is less than the predetermined threshold value, and returning a reference of a dispatcher that executes the selected object to the destination as a response;
   in executing the object in the first program control device, reading the object information corresponding to the object from the storage means of the first program control device to execute the object if the object has a load that is less than the predetermined threshold value, and returning a processing result to a destination as a response;
   reading the object information corresponding to the object from the storage means of the first program control device to notify the object information to the second program control device;
   receiving the notified object information to update object information stored in the storage means of the second program control device;
   in solving an object name in the second program control device, reading the updated object information corresponding to the object from the storage means of the second program control device to select the object having a load that is less than the predetermined threshold value, and returning a reference of an object allocation control part that allocates the selected object to the destination as a response;

when the object allocation control part receives a request to allocate the object that is identified by the reference in the second program control device, reading the updated object information corresponding to the object from the storage means of the second program control device to select the object having a load that is less than the predetermined threshold value, and returning a reference of a dispatcher that executes the selected object to the destination as a response; and when the dispatcher identified by the reference of the dispatcher receives a request for processing the object, in the second program control device, reading the updated object information corresponding to the object from the storage means of the second program control device to execute the object if the object has a load that is less than the predetermined threshold value, and returning a processing result to the destination as a response.

* * * * *